US011263240B2

(12) United States Patent
Starr et al.

(10) Patent No.: US 11,263,240 B2
(45) Date of Patent: *Mar. 1, 2022

(54) ORGANIZING SURVEY TEXT RESPONSES

(71) Applicant: Qualtrics, LLC, Provo, UT (US)

(72) Inventors: Jeffrey Wade Starr, Orem, UT (US); Robert David Norton, Provo, UT (US)

(73) Assignee: Qualtrics, LLC, Provo, UT (US)

( * ) Notice: Subject to any disclaimer, the term of this patent is extended or adjusted under 35 U.S.C. 154(b) by 376 days.

This patent is subject to a terminal disclaimer.

(21) Appl. No.: 16/426,806

(22) Filed: May 30, 2019

(65) Prior Publication Data

US 2019/0278788 A1  Sep. 12, 2019

Related U.S. Application Data

(63) Continuation of application No. 14/927,256, filed on Oct. 29, 2015, now Pat. No. 10,339,160.

(51) Int. Cl.
| | | |
|---|---|---|
| *G06F 16/28* | (2019.01) | |
| *G06F 16/93* | (2019.01) | |
| *G06F 16/955* | (2019.01) | |
| *G06F 16/35* | (2019.01) | |

(52) U.S. Cl.
CPC .......... *G06F 16/285* (2019.01); *G06F 16/353* (2019.01); *G06F 16/93* (2019.01); *G06F 16/955* (2019.01)

(58) Field of Classification Search
CPC ...... G06F 16/285; G06F 16/353; G06F 16/93; G06F 16/955; G06F 40/216
See application file for complete search history.

(56) References Cited

U.S. PATENT DOCUMENTS

| | | |
|---|---|---|
| 5,410,724 A | 4/1995 | Worthy |
| 5,732,257 A | 3/1998 | Atkinson et al. |
| 6,052,121 A | 4/2000 | Webster et al. |
| 6,189,029 B1 | 2/2001 | Fuerst |
| 6,754,676 B2 | 6/2004 | Dietz et al. |

(Continued)

OTHER PUBLICATIONS

"A Literature Survey on Fatigue Analysis Approaches for Rubber", by W Mars and F Faterni, Department of Mechanical, Industrial, and Manufacturing Engineering, University of Toledo, Toledo, OH 43606-3390, USA, International Journal of Fatigue 24, pp. 949-961, 2002. (Year: 2002).

(Continued)

*Primary Examiner* — Merilyn P Nguyen
(74) *Attorney, Agent, or Firm* — Keller Jolley Preece

(57) ABSTRACT

Embodiments of the present disclosure relate generally to organizing electronic text documents. In particular, one or more embodiments comprise a content management system that improves the organization of electronic text documents by intelligently and accurately categorizing electronic text documents by topic. The content management system organizes electronic text documents based on one or more topics, without the need for a human reviewer to manually classify each electronic text document, and without the need for training a classification algorithm based on a set of manually classified electronic text documents. Further, the content management system identifies and suggests topics for electronic text documents that relate to new or emerging topics.

20 Claims, 9 Drawing Sheets

(56) References Cited

U.S. PATENT DOCUMENTS

| | | | |
|---|---|---|---|
| 7,085,812 B1 | 8/2006 | Sherwood | |
| 7,233,940 B2* | 6/2007 | Bamberger | G06F 11/006 |
| 7,383,200 B1 | 6/2008 | Walker et al. | |
| 7,509,382 B1 | 3/2009 | Jania et al. | |
| 8,019,753 B2 | 9/2011 | Podgorny et al. | |
| 8,335,719 B1 | 12/2012 | Quraishi et al. | |
| 8,417,715 B1 | 4/2013 | Bruckhaus et al. | |
| 8,543,578 B2 | 9/2013 | Spaggiari | |
| 8,751,327 B2 | 6/2014 | Park et al. | |
| 8,767,934 B2* | 7/2014 | Brunson | H04M 3/42042 379/201.12 |
| 8,849,854 B2 | 9/2014 | Kakarla et al. | |
| 8,909,587 B2 | 12/2014 | Alush et al. | |
| 9,298,700 B1 | 3/2016 | Jesensky et al. | |
| 9,372,592 B1 | 6/2016 | Goodspeed et al. | |
| 9,392,334 B2* | 7/2016 | Cox | H04N 21/26283 |
| 9,514,436 B2 | 12/2016 | Marci et al. | |
| 9,881,010 B1 | 1/2018 | Gubin et al. | |
| 10,140,739 B1 | 11/2018 | Burgin et al. | |
| 10,223,442 B2 | 3/2019 | Starr | |
| 2001/0052122 A1 | 12/2001 | Nanos et al. | |
| 2002/0052774 A1 | 5/2002 | Parker et al. | |
| 2002/0161752 A1 | 10/2002 | Hutchison | |
| 2003/0105659 A1 | 6/2003 | Eisenstein | |
| 2005/0060222 A1 | 3/2005 | White | |
| 2006/0129446 A1 | 6/2006 | Ruhl et al. | |
| 2006/0212413 A1 | 9/2006 | Rujan et al. | |
| 2007/0150279 A1 | 6/2007 | Gandhi et al. | |
| 2007/0244865 A1 | 10/2007 | Gordon et al. | |
| 2008/0140684 A1* | 6/2008 | O'Reilly | G06F 16/353 |
| 2008/0201130 A1 | 8/2008 | Peters et al. | |
| 2008/0263022 A1 | 10/2008 | Kostorizos et al. | |
| 2009/0083096 A1 | 3/2009 | Liu et al. | |
| 2009/0094233 A1 | 4/2009 | Marvit et al. | |
| 2009/0157714 A1 | 6/2009 | Stanton et al. | |
| 2009/0210444 A1 | 8/2009 | Bailey et al. | |
| 2009/0287642 A1 | 11/2009 | Poteet et al. | |
| 2009/0287668 A1 | 11/2009 | Evans et al. | |
| 2009/0306967 A1 | 12/2009 | Nicolov et al. | |
| 2010/0223273 A1 | 9/2010 | Schneider | |
| 2010/0280973 A1* | 11/2010 | Banker | G06Q 10/10 705/400 |
| 2011/0010182 A1* | 1/2011 | Turski | H04L 51/08 705/1.1 |
| 2011/0076663 A1 | 3/2011 | Krallman et al. | |
| 2011/0173049 A1 | 7/2011 | McHale | |
| 2013/0297292 A1 | 11/2013 | Agarwal | |
| 2013/0339074 A1 | 12/2013 | Nagy et al. | |
| 2013/0346128 A1 | 12/2013 | Kibbe | |
| 2014/0149836 A1 | 5/2014 | Bedard et al. | |
| 2014/0156349 A1 | 6/2014 | McLoughlin | |
| 2014/0229456 A1 | 8/2014 | Hollifield et al. | |
| 2014/0234810 A1 | 8/2014 | Flor et al. | |
| 2014/0289231 A1* | 9/2014 | Palmert | G06F 16/345 707/723 |
| 2014/0310062 A1 | 10/2014 | Klein et al. | |
| 2014/0310329 A1 | 10/2014 | Jones et al. | |
| 2014/0316856 A1 | 10/2014 | Williams et al. | |
| 2014/0358636 A1 | 12/2014 | Nowak et al. | |
| 2015/0142888 A1 | 5/2015 | Browning et al. | |
| 2015/0161248 A1 | 6/2015 | Majkowska | |
| 2015/0234571 A1 | 8/2015 | Lee et al. | |
| 2015/0269529 A1 | 9/2015 | Kyllonen et al. | |
| 2015/0324811 A1 | 11/2015 | Courtright et al. | |
| 2015/0356174 A1 | 12/2015 | Narayana et al. | |
| 2016/0019569 A1 | 1/2016 | Jaggi et al. | |
| 2016/0070762 A1 | 3/2016 | Nicholls et al. | |
| 2016/0110789 A1 | 4/2016 | Gilb | |
| 2016/0180359 A1 | 6/2016 | Qu | |
| 2016/0196491 A1 | 7/2016 | Chandrasekaran et al. | |
| 2016/0350293 A1 | 12/2016 | Gates | |
| 2016/0350771 A1 | 12/2016 | Gardner | |
| 2017/0124174 A1 | 5/2017 | Starr et al. | |
| 2018/0005289 A1 | 1/2018 | Angell et al. | |
| 2018/0032606 A1 | 2/2018 | Tolman et al. | |
| 2018/0240138 A1 | 8/2018 | Le et al. | |
| 2018/0246975 A1* | 8/2018 | Zheng | G06F 16/9535 |
| 2018/0268052 A1 | 9/2018 | Litvak et al. | |
| 2019/0146984 A1 | 5/2019 | Starr | |

OTHER PUBLICATIONS

LimeSurvey, 2015, https://web.archive.org/web/20150501055458/http://ie.usca.edu/Linne/handout.pdf (Year: 2015).

Matthias Schonlau et al. "Conducting Research Surveys via E-mail and the Web" © 2002 RAND Corporation, ISBN/EAN: 0-8330-3110-4. Retrieved from https://www.rand.org/pubs/rnonograph reports/MR1480.html (Year: 2002).

No Author "Creating and using online surveys" University of Exeter Jul. 2012. Retrieved from https://as.exeterac.uk/nnedia/universityofexeter/acadernicservices/educationenhancernent/cascade/Creating and using online surveys.pdf (Year: 2012).

U.S. Appl. No. 14/682,964, Jun. 15, 2017, Office Action.
U.S. Appl. No. 14/682,964, Jan. 10, 2018, Office Action.
U.S. Appl. No. 14/682,964, May 3, 2018, Office Action.
U.S. Appl. No. 14/682,964, Oct. 10, 2018, Notice of Allowance.
U.S. Appl. No. 14/727,511, Jun. 21, 2017, Office Action.
U.S. Appl. No. 14/727,511, Jan. 29, 2018, Office Action.
U.S. Appl. No. 14/727,511, Aug. 10, 2018, Office Action.
U.S. Appl. No. 14/727,511, Jan. 9, 2019, Office Action.
U.S. Appl. No. 14/727,511, Apr. 29, 2019, Office Action.
U.S. Appl. No. 14/927,256, May 31, 2018, Office Action.
U.S. Appl. No. 14/927,256, Nov. 1, 2018, Office Action.
U.S. Appl. No. 14/927,256, Feb. 25, 2019, Notice of Allowance.
U.S. Appl. No. 15/199,678, Oct. 1, 2018, Office Action.
U.S. Appl. No. 15/199,678, May 10, 2019, Office Action.
U.S. Appl. No. 15/649,477, May 16, 2019, Office Action.
U.S. Appl. No. 15/472,893, May 31, 2019, Office Action.
U.S. Appl. No. 15/649,477, Nov. 27, 2019, Office Action.
U.S. Appl. No. 15/472,893, Dec. 11, 2019, Office Action.
U.S. Appl. No. 15/649,477, Feb. 11, 2021, Office Action.
U.S. Appl. No. 15/472,893, Dec. 28, 2020, Office Action.
Susan J. McMurry, "JMP—An Introductory User's Guide", Jul. 24, 1992, https://www.dartnnouth.eduk-chance/teaching aids/ JMP.guide.pdf (Year: 1992).
U.S. Appl. No. 14/727,511, Jun. 11, 2020, Office Action.
U.S. Appl. No. 15/649,477, Aug. 7, 2020, Office Action.
U.S. Appl. No. 15/472,893, Jun. 24, 2020, Office Action.
U.S. Appl. No. 14/727,511, Nov. 7, 2019, Office Action
U.S. Appl. No. 15/199,678, Aug. 27, 2019, Notice of Allowance.
U.S. Appl. No. 15/199,678, Oct. 24, 2019, Notice of Allowance.
Greg Laughlin, "Statwing Tuturoial by Greg Laughlin", https://www.youtube.com/watch?v=VWqXS9nwXss (Year: 2013).
Appraisal 1st Property Solutions, "Statwing Demo",https://www.youtube.coni/watch?v=eUGwVDbc8AA (Year: 2015).
Statwing, "Statwing Website", https://winwstatwing.com (Year: 2015).
U.S. Appl. No. 15/472,893, May 14, 2021, Office Action.
U.S. Appl. No. 16/249,076, Jul. 21, 2021, Office Action.
Appraisals 1st Property Solutions, "Condition Adjustment using Statwing",https://www.youtube.com/watch?v=esDeihnqAic (Year: 2015).
Svetlana Cheusheva, "Concatenate in Excel: combine text strings, cells, and columns" (Year: 2016).
U.S. Appl. No. 15/649,477, filed Dec. 9, 2021, Office Action.
U.S. Appl. No. 15/472,893, filed Oct. 5, 2021, Office Action.
U.S. Appl. No. 16/249,076, filed Nov. 22, 2021, Office Action.

* cited by examiner

ORGANIZING SURVEY TEXT RESPONSES

CROSS REFERENCE TO RELATED APPLICATIONS

This application is a continuation of U.S. patent application Ser. No. 14/927,256, filed Oct. 29, 2015, now issued as U.S. Pat. No. 10,339,160. The aforementioned application is hereby incorporated by reference in its entirety.

BACKGROUND

1. Technical Field

One or more embodiments relate generally to systems and methods of organizing electronic documents. More specifically, one or more embodiments relate to systems and methods of organizing electronic documents by topic.

2. Background and Relevant Art

The advent of computer technology has lead to an increase in communication using various forms of electronic documents. More specifically, advances in computer technology have allowed users to easily generate, duplicate, and communicate electronic text documents. Examples of electronic text documents include computer data files comprising free-form text, such as responses to survey questions, e-commerce customer reviews, electronic messages (e.g., email), or social media posts (e.g., tweets). Additionally, the development of computer technology has enabled users to organize electronic text documents using various techniques. Conventional techniques of organizing electronic text documents, however, are often overwhelmed and not useful when users attempt to organize large numbers of electronic text documents in a helpful way. Accordingly, conventional systems and methods of organizing electronic text documents typically present several disadvantages.

To illustrate, conventional systems of organizing electronic text documents are generally expensive and/or require significant human effort. For example, many conventional methods rely on human reviewers to manually read and classify each electronic text document by assigning one or more predetermined topics (e.g., codes, labels, tags, categories, etc.) to each electronic text document. Having a human reviewer read through and classify each electronic text document consumes a significant amount of time and resources, especially when the number of electronic text documents is of the order of tens or hundreds of thousands or more.

In an effort to reduce the amount of time and resources needed to manually review each electronic text document, some conventional systems attempt to organize electronic text documents using a classification algorithm. Most conventional classification algorithms, however, generally require training using a set of manually classified electronic text documents, which can take significant time and incur substantial expense. Moreover, even when conventional systems employ a classification algorithm, the classification algorithm is often static and limited in flexibility, which frequently leads to the inaccurate classification of electronic text documents. More specifically, most conventional classification algorithms are limited to predetermined topics and cannot adapt to emergent or novel topics (e.g., topics that may be included within the electronic text documents, but are never identified because the emergent topics are not included in the predetermined topics). Thus, given the limitation of static predetermined topics and the inability to identify emergent topics, conventional systems are usually rigid, inflexible, and prone to error.

Furthermore, conventional systems of organizing electronic documents can result in the incorrect organization of electronic text documents due to poor handling of various features of written human language. In particular, conventional systems are often incapable of handling polysemy (i.e., a word having many meanings) and synonymy (i.e., multiple words having the same meaning). As an example of polysemy, the word "bed" can mean a piece of furniture upon which a person sleeps or the bottom of a lake, river, sea, or other body of water. As such, many conventional methods of organizing electronic documents typically fail to differentiate between multiple meanings of individual words (e.g., such approaches may organize electronic text documents referring to a person's bed in the same grouping as electronic text documents referring to a lake bed).

As an example of synonymy, the words "couch" and "sofa" can both mean a piece of furniture upon which two or more people can sit. Conventional systems, however, often fail to classify two electronic text documents together based on the sharing of synonyms. Rather, conventional systems often classify the two electronic text documents in separate groupings. Consequently, conventional systems are often incapable of effectively handling various features of written human language, which leads to the inaccurate classification of electronic text documents.

Accordingly, there are a number of considerations to be made in organizing electronic text documents.

SUMMARY

One or more embodiments disclosed herein provide benefits and/or solve one or more of the foregoing or other problems in the art with systems and methods for organizing electronic text documents. In particular, one or more embodiments reduce the cost, time, and manpower needed to organize electronic text documents. For example, one or more embodiments provide systems and methods for allocating predetermined topics to electronic text documents without the need for human reviewers to manually read and classify each electronic text document. In addition, various embodiments provide systems and methods for organizing electronic documents by predetermined topics without training a classification algorithm using a set of manually classified electronic text documents. Accordingly, one or more embodiments improve the organization of electronic text documents by reducing the expense, time, and human effort associated with classifying electronic text documents into topics.

Further, various embodiments disclosed herein provide systems and methods for identifying electronic text documents that do not fit with any predetermined topics, as well as identifying emergent topics. As such, various embodiments provide systems and methods for adding a topic to a set of predetermined topics and associating the added topic with one or more electronic text documents. As an example, various embodiments identify emergent topics and provide topic suggestions based on the identified emergent topics. Consequently, one or more embodiments assist in more precisely organizing electronic text documents through the flexible and dynamic management of predetermined and emergent topics.

Furthermore, one or more embodiments improve the organization of electronic text documents by more effectively handling various features of written human language.

In particular, one or more embodiments facilitate greater accuracy in organizing electronic text documents by handling polysemy and synonymy. For instance, various embodiments handle polysemy by providing systems and methods for utilizing a probabilistic language model to differentiate between multiple meanings of the same word. Additionally, various embodiments handle synonymy by providing systems and methods for utilizing a probabilistic language model to cluster electronic text documents together based on the electronic text documents sharing synonyms and/or words that appear in similar contexts, or the probabilistic likelihood of the electronic text documents sharing synonyms and/or words that appear in a similar context. Accordingly, one or more embodiments improve the accuracy of organizing electronic text documents by effectively handling various features of written human language.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots, etc.) are used herein to illustrate optional features or operations that add additional features to one or more embodiments. Such notation, however, should not be taken to mean that these are the only options or optional operations, and/or that blocks with solid borders are not optional in certain embodiments. Understanding that these drawings depict only typical embodiments and are not considered to be limiting, embodiments will be described and explained with additional specificity and detail through the use of the accompanying drawings in which.

DETAILED DESCRIPTION

Figure 1:
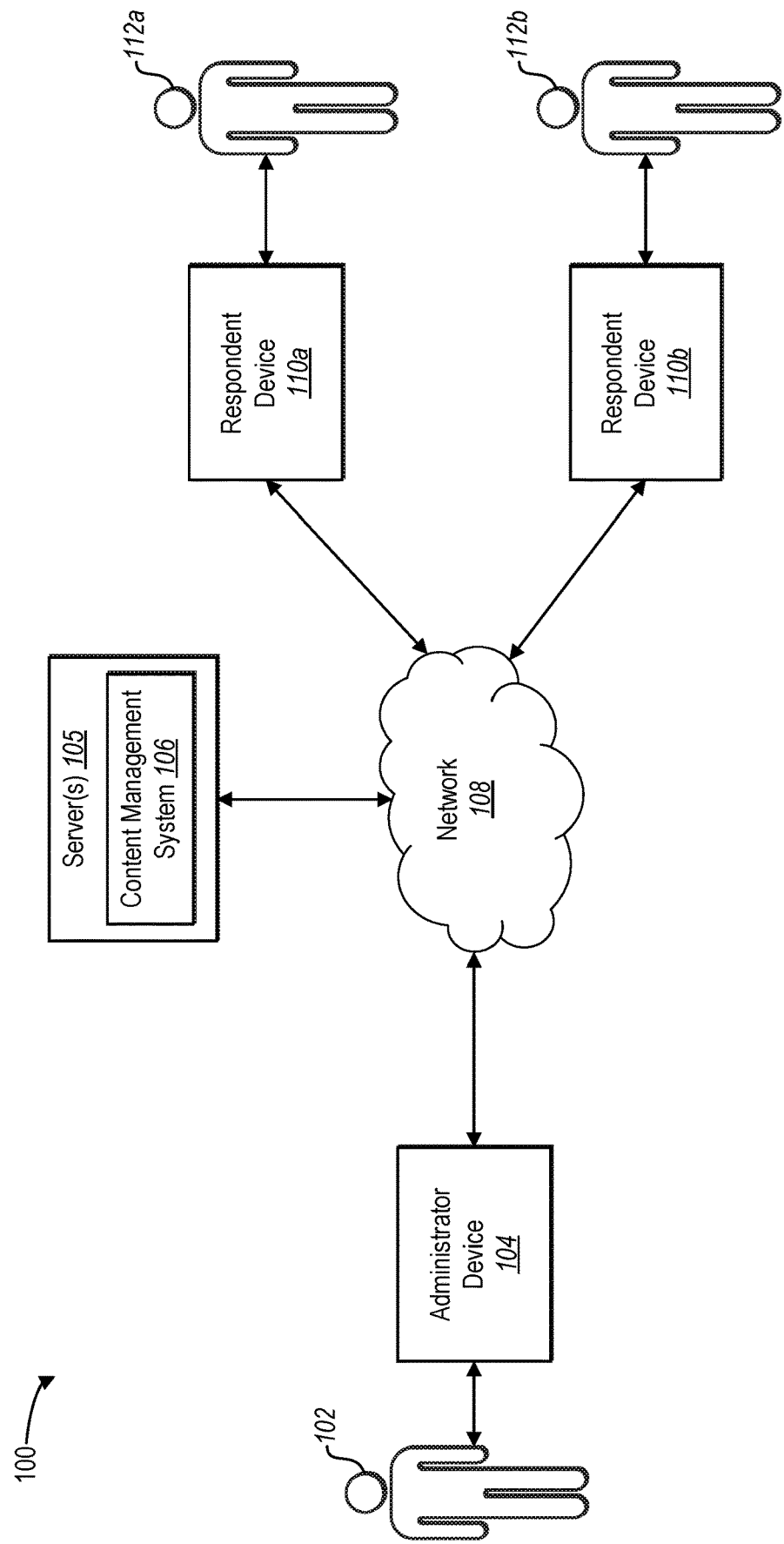
FIG. 1 illustrates a schematic diagram of a communication system in accordance with one or more embodiments.

One or more embodiments disclosed herein provide a content management system that improves the organization of electronic text documents by intelligently and accurately categorizing electronic text documents by topic. For example, in one or more embodiments a content management system can categorize electronic text documents by user specified topics. Further, the content management system identifies novel and emerging topics within electronic text documents. As an example, in one or more embodiments, the content management system assigns electronic text documents to one or more topics predetermined by a human without the need for a human reviewer to manually classify each electronic text document, and generally without the need for a human reviewer to train a classification algorithm. In addition, in one or more embodiments, the content management system identifies and suggests topics for electronic text documents that relate to topics outside the scope of the predetermined topics. Overall, the content management system improves the organization and topic categorization of electronic text documents while also reducing the cost, time, and manpower needed to organize the electronic text documents.

The systems and methods described herein can be used in a variety of applications where the classifying or categorizing of electronic text is useful. One example application is the organizing of electronic text documents that include free-form text responses to an electronic survey question. Using a set of pre-defined topics, the content management system can assign and/or code each text response that corresponds to one or more pre-defined topics to a corresponding topic. In some cases, however, a text response may not correspond to any of the pre-defined topics. As such, the content management system may temporarily code the unassigned text responses as unknown (e.g., topic unknown), or simply identify leave the unassigned text responses as unassigned.

After assigning and/or coding each text response, the content management system can provide the results of the topic assignments to a user, such as a survey reviewer. For example, the content management system can provide the text responses organized by topic. As such, a survey reviewer, for example, can easily access text responses based on a topic that is of interest to the survey reviewer. In addition, the content management system can present additional information in the way the text responses are organized. For instance, the content management system can provide the number of text responses assigned to each topic, order the text responses within each topic category in an order from most relevant to least relevant, group text responses within a topic category based on sub-categories or relatedness, etc.

Moreover, the content management system can organize any unassigned text responses to easily allow a user to identify and review those text responses that the content management system determines are not related to any of the pre-defined topics. In one or more embodiments, a user can provide the content management system with additional topics that potentially relate to the electronic text documents, and in particular, the unassigned electronic text documents that do not correspond to a topic. For example, in response to the content management system providing the topic assignment results to the user, the user may review one or more of the unassigned electronic text documents. Based on reviewing some of the unassigned electronic text documents, the user may provide the content management system with additional topics. Using the additional topics, the content management system can determine whether any of the unassigned electronic text documents (and, in some cases, the previously assigned electronic text documents) correspond to one or more of the additional topics. The content management system can then provide updated topic assignment results to the user based on the additional topic(s) provided by the user. Further, if desired, the user can again provide additional topics to further reduce the number of unassigned electronic text documents.

In some embodiments, the content management system can determine and provide suggested topics that may relate to unassigned text responses. For example, when providing the topic assignment results to the user, the content management system can also provide a list of suggested topics. The content management system can determine the suggested topics by analyzing the content within the unassigned electronic text documents, and in some instances, the assigned electronic text documents. As described in further detail below, the content management system can define word communities, iteratively determine prevailing topics found within each word community, and provide the prevailing topics to the user as suggested topics. In this manner, the content management system can identify and provide emergent topics that a user (e.g., a survey administrator) may not have anticipated as a relevant topic, but that may be a relevant topic based on the text response of other users (e.g., responses to a survey question).

As mentioned above, the content management system can assign and/or code an electronic text document to one or more corresponding predetermined topics. As described in additional detail below, the content management system can use a probabilistic model to determine whether content within an electronic text document matches, or has a likelihood of matching, one of the predetermined topics. For example, the content management system can employ a frequentist approach and/or Latent Dirichlet Allocation (LDA) within the probabilistic model to estimate correlations between a portion of content in an electronic text document and other content in the electronic text document, or content in other electronic text documents. Further, the content management system can use the probabilistic model to arrive at a probability that an electronic text document matches a topic. Then, when content within an electronic text document has a probability of corresponding to a topic over a threshold level, the content management system assigns and/or codes the electronic text document to the topic.

The content management system provides a number of benefits over conventional systems. As mentioned above, the content management system improves the organization and topic categorization of electronic text documents while also reducing the cost, time, and manpower needed to organize the electronic text documents. In addition, by using the probabilistic model, the content management system can handle synonymy and polysemy. As an example, by utilizing a probabilistic language model, the content management system can identify and differentiate between a first electronic text document that uses a word for a first meaning (e.g., a "bed" for sleeping) and a second electronic text document that uses the same word for a second meaning (e.g., a "bed" of a body of water). Further, the content management system automatically suggests and, in some cases, applies suggested topics for the user.

As used herein, the term "electronic text document" refers to electronic data that includes content. Content may include words, graphics, and/or other data. An electronic text document may be used to convey information from one user, such as an author of the electronic text document, to another user, such as a reviewer of the electronic text document.

As used herein, the term "survey" refers to an electronic communication used to collect information. For example, the term survey may include an electronic communication in the form of a poll, questionnaire, census, or other type of sampling. Further, the term survey as used herein may generally refer to a method of requesting and collecting electronic text documents from respondents via an electronic communication distribution channel. As used herein, the term "respondent" refers to a person who participates in, and responds to, a survey.

As used herein, the term "survey question" refers to prompts included in a survey that invoke a response from a respondent. Example types of questions include, but are not limited to, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. In one or more embodiments, a survey question may comprise a question portion as well as an available answer choice portion that corresponds to the survey question.

As used herein, the term "response" refers to any type of electronic data provided as a content item by a respondent. The electronic data may include content and/or feedback from the respondent in response to a survey question. Depending on the question type, the response may include, but is not limited to, a selection, a text input, an indication of an answer selection, a user provided answer, and/or an attachment. For example, a response may include content, such as a free-from text response provided by a respondent. In general, unless otherwise stated, reference to a text response refers to a free-from text response.

The term, "distribution channel," as used herein, refers generally to an electronic communication channel. Examples of distribution channels may include wired or wireless channels, such as online connections, electronic mail, and electronic messages (e.g., instant messages, text messages, multi-media messages, etc.). In some embodiments, a distribution channel requires using a specific protocol when sending electronic data via the distribution channel. As a result, electronic data may need to be converted to a specific type of protocol before being sent over a corresponding distribution channel. For example, electronic data sent to a mobile device via an SMS distribution channel must be based on SMS protocol before the electronic data can be sent via the SMS distribution channel.

FIG. 1 illustrates a schematic diagram of a communication system 100 in accordance with one or more embodiments. As illustrated, the communication system 100 includes an administrator 102 that uses an administrator device 104 to access one or more servers 105 hosting a content management system 106. The administrator device 104 may connect to the one or more servers 105 hosting the content management system 106 via a network 108. Further, respondents 112a, 112b (or collectively "respondents 112") can use corresponding respondent devices 110a, 110b (or collectively "respondent devices 110") to access the content management system 106 via the network 108.

The administrator 102 and the respondents 112 may each be an individual (i.e., human user), a business, a group, or other entity. Further, the administrator device 104 and the respondent devices 110 may each be a type of computing device. One type of computing device includes a mobile device (e.g., a cell phone, a smartphone, a PDA, a tablet, a laptop, a watch, a wearable device, etc.). Another type of computing device includes a non-mobile device (e.g., a desktop or server; or another type of client device). Additional details with respect to computing devices are discussed below with respect to FIG. 8.

As mentioned above, the content management system 106 organizes electronic text documents. As an initial matter, to aid in describing the content management system 106 and for ease in explanation, the content management system is described in the context of organizing survey free-form text responses (or simply text responses) rather than electronic text documents. One will appreciate, however, that the concepts and principles described herein can also apply to organizing electronic text documents and/or other electronic documents that contain content.

To illustrate, the content management system 106 sends a survey with one or more open-ended questions to the respondents 112 via the respondent devices 110. The respondents 112 complete the survey and provide the responses back to the content management system 106. The content management system 106 then collects the answers to the survey questions (e.g., the text responses), and groups the responses. For instance, a user provides initial topics to the content management system 106 (as further described below), and the content management system 106 groups the responses based on the initial topics.

In addition to providing surveys to the respondents and collecting responses, the content management system 106 can identify a list of topics that potentially correspond to the collected text responses. In some embodiments, the administrator 102 provides one or more topics for each survey question, or for the multiple survey questions. In other embodiments, the topics are generated based on characteristics of a survey (e.g., subject matter of the questions, type of industry/business related to the survey, demographics of respondents, etc.) Regardless of the source of the topics, the list of topics is stored on the content management system 106. Using the list of topics, the content management system 106 can organize the collected text responses by determining that a text response corresponds with a particular topic(s), and then assigning the text response to the determined topic(s), as will be explained in detail below with respect to FIGS. 3-4.

As will often be the case, some text responses will not match any of the topics in the list of topics. When the content management system 106 does not assign and/or code a text response to one of the available topics, the content management system 106 can obtain additional topics, for example, from the administrator 102. For example, an administrator can review a single (or multiple) unassigned text response(s) and identify and provide the content management system 106 the additional topic. The content management system 106 then uses the additional topics to attempt to code other previously unassigned text responses, as well as check to see if other previously assigned text responses may also relate to the additional topic (e.g., a single text response may include content that relates to more than one topic). In this manner, the content management system 106 can quickly and accurately reduce the number of unassigned text responses.

In addition, in one or more embodiments, the content management system 106 provides suggested topics to the administrator 102 and/or automatically organizes the text responses based on one or more of the suggested topics. For example, the content management system 106 can identify topics based on analyzing the text responses, and in particular, the unassigned text responses. Upon providing suggested topics to the administrator 102, the administrator 102 may select one or more of the suggested topics as the additional topics to use for the content management system 106 to further assign and code the text responses.

Although FIG. 1 illustrates a particular arrangement of the administrator device 104, content management system 106, respondent devices 110, and the network 108, various additional arrangements are possible. For example, the administrator device 104 may directly communicate with the one or more servers 105 hosting the content management system 106, bypassing the network 108. Further, while only one administrator device 104 and two respondent devices 110 are illustrated, the communication system 100 can include any number of administrator devices and respondent devices (and corresponding users).

Figure 2:
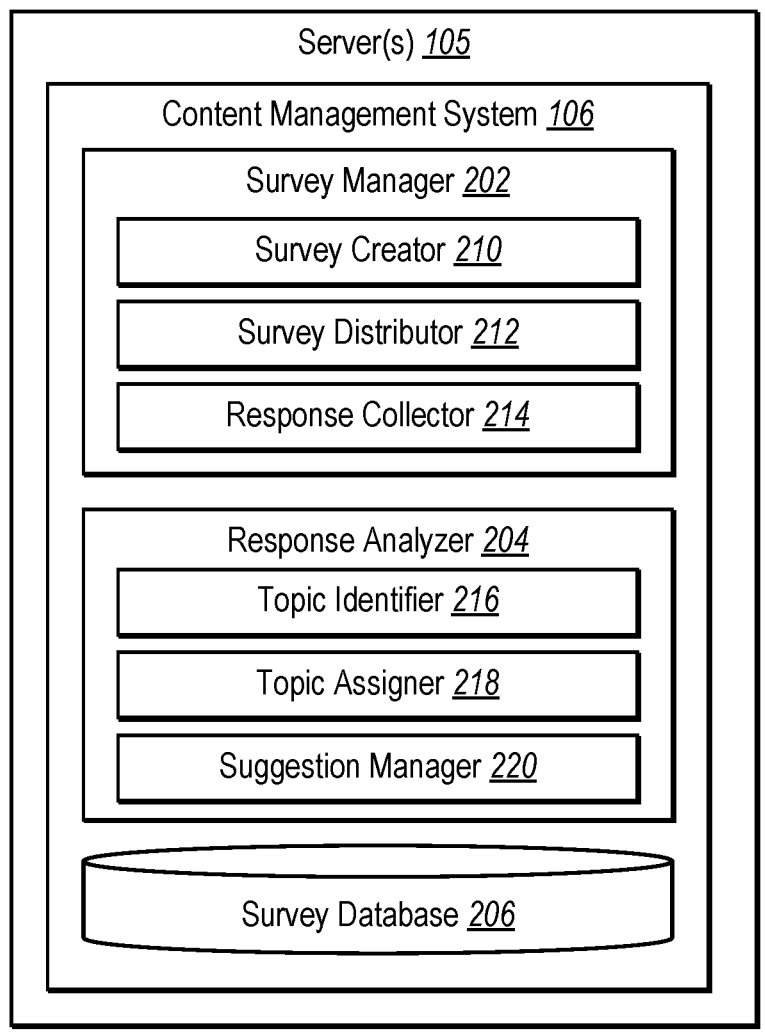
FIG. 2 illustrates a schematic diagram of a content management system in accordance with various embodiments.

FIG. 2 illustrates a schematic diagram of a content management system 106 in accordance with one or more embodiments. The content management system 106 may be an example embodiment of the content management system 106 described with respect to FIG. 1. For example, the content management system 106 shown in FIG. 2 may center on the specific embodiment of surveys and survey responses, however, one will appreciate that the corresponding principles described in connection with the content management system 106 in FIG. 2 applies to any electronic text documents received or generated from any source.

The content management system 106 in FIG. 2 can include various components for performing the methods, processes, and features described herein. For example, as illustrated, the content management system 106 includes a survey manager 202, a response analyzer 204, and a survey database 206. The various components of the content management system 106 communicate with each other using any suitable communication protocols, such as described with respect to FIGS. 8 and 9 below.

Each component of the content management system 106 may be implemented using one or more computing devices, (e.g., server devices) including at least one processor executing instructions that cause the content management system 106 to perform the processes described herein. The components of the content management system 106 can be implemented by a single server device or across multiple server devices, as described above. Although a particular number of components are shown in FIG. 2, the content management system 106 can include more components or can combine the components into fewer components (such as a single component), as may be desirable for a particular implementation.

As illustrated, the content management system 106 includes a survey manager 202. The survey manager 202 can manage the creation of a survey, including the composition of one or more survey questions. Additionally, the survey manager 202 can facilitate the identification of potential respondents and the distribution of surveys. Further, the survey manager 202 can manage the collection of responses provided by respondents. Accordingly, as shown in FIG. 2, the survey manager 202 includes a survey creator 210, a survey distributer 212, and a response collector 214.

The survey creator 210 can assist a user (e.g., a survey creator or administrator) in creating a survey by providing tools to the user to select various template questions, question types, and/or response types. As part of assisting a user in creating a survey, the survey creator 210 may suggest survey questions to include in the survey. For example, if a user selects a question that prompts a respondent to select an answer from a range of available answer choices, the survey creator 210 may recommend that the user also add an open ended question to ask the respondent depending on the respondent's answer to the question.

The survey creator 210 may provide other features to assist a user in the creation and composition of survey questions to present to respondents. For instance, the survey creator 210 may provide alternative wording for questions provided by the user. Further, the survey creator 210 may allow the user to preview the set of survey questions as if a respondent was viewing the survey, as well as edit a survey that the user is creating or has created.

Further, the survey creator 210 may allow a user to specify preferences and/or parameters for one or more surveys. For example, the user may use the survey creator 210 to specify the beginning date of a survey, a survey's duration, and/or when a survey expires. The survey creator 210 may also enable a user to specify how long a respondent has to complete a survey, or the time (e.g., either a minimum time or a maximum time) a respondent has to respond to a survey question.

As briefly mentioned above, the content management system 106 includes a survey distributor 212. When the content management system 106 administers a survey, the survey distributor 212 may send the survey to, and receive responses to the survey from, designated respondents. In particular, the survey distributor 212 may send surveys to and receive responses from respondents via one or more distribution channels selected by the user, such as via a website, text message, instant message, electronic message, mobile application, etc.

The response collector 214 collects and sorts responses from completed surveys provided by respondents. The response collector 214 may collect responses in a variety of ways. To illustrate, the response collector 214 may extract responses to a survey question in bulk. For example, the response collector 214 may collect multiple responses to a survey question at once. In addition, or in the alternative, the response collector 214 may collect responses to a survey question in real-time or periodically as respondents provide responses to the survey question.

In one or more embodiments, upon collecting responses, the response collector 214 may facilitate the storage of the responses. For example, the response collector 214 stores responses in the survey database 206. Further, the response collector 214 can separately store responses for each survey question. For instance, if a survey includes two survey questions, the response collector 214 can store responses for the first survey question together and responses for the second survey question together. Additionally or alternatively, the response collector 214 may store the responses outside of the survey system or on an electronic storage system belonging to a third-party.

The response collector 214 may also provide results. For example, upon the response analyzer 204 determining topic results, as described below, the response collector 214 may provide the topic results to the user that created the survey, a survey administrator, and/or a survey result reviewer. The response collector 214 may present the topic results using charts, graphs, and/or other methods that allow a user to review the survey results of a survey question or questions. Further, the response collector 214 may update the results as additional answers are received from respondents.

As shown in FIG. 2, and as mentioned above, the content management system 106 includes a response analyzer 204. In general, the response analyzer 204 can identify topics used to organize text responses, assign text responses to one or more topics, and provide topic suggestions based on potential emergent topics. As such, the response analyzer 204 includes a topic identifier 216, a topic assigner 218, and a suggestion manager 220.

The topic identifier 216 identifies one or more topics used to organize text responses for a survey question. The topic identifier 216 may receive one or more topics from a user. For example, a survey reviewer or administrator may provide a list of predetermined topics to the topic identifier 216. Further, the user may add additional topics or remove topics from the list of topics. Additionally, and/or alternatively, the topic identifier 216 may load a list of topics stored within the content management system 106. For instance, the topic identifier 216 loads a list of topics previously provided by the user.

The topic identifier 216 can identify a list of one or more topics for individual survey questions, multiple survey questions with a survey, or survey question(s) across multiple surveys. For example, the topic identifier 216 can identify and maintain a first list of topics for text responses that correspond to a single survey question. In another example, the topic identifier 216 can use a second list of topics for text responses that correspond to a second group of related survey questions.

The topic assigner 218 can use the topics to assign and/or code to text responses. In particular, the topic assigner 218 determines whether a text response corresponds to a topic, and if so, assigns and/or codes the text response to the topic. In some cases, the topic assigner 218 determines that a text response corresponds to multiple topics. In other cases, the topic assigner 218 determines that the correlation between a text response and available topics is too weak to assign and/or code the text response to a topic. Accordingly, the topic assigner 218 leaves the text response as unassigned or temporarily assigns the text response to an "unknown" or "unassigned" topic.

Figure 5:
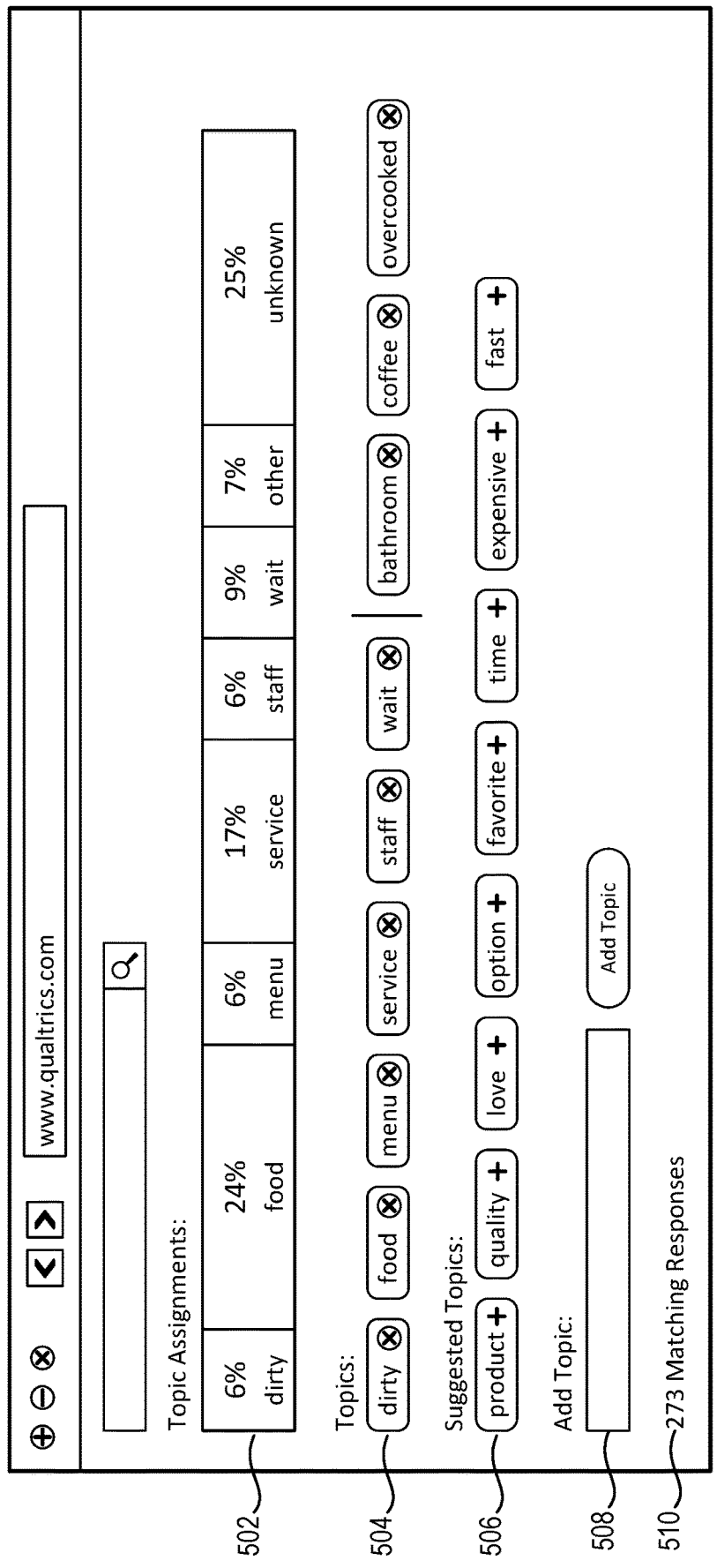
FIG. 5 illustrates an example graphical user interface that displays a results dashboard for text responses to one or more survey questions in accordance with one or more embodiments.

The topic assigner 218 may assign and/or code each text response in a group of text responses. For example, the topic assigner 218 may determine a topic to which each text response to a survey question corresponds. The topic assigner 218 may then generate a report that displays topic assignment results, including the number or percentage of text responses that are assigned to each topic, as well as the number or percentage of text responses that are unassigned or assigned to "unknown." As described above, the survey manager 202 may provide the results, such as the topic assignment results, to a user. FIG. 5, described below, illustrates an example of presenting topic assignment results to a user.

Further, in various embodiments, the topic assigner 218 reanalyzes text responses upon the content management system 106 receiving additional topics from a user. For example, upon reviewing topic assignment result, a user may provide one or more additional topics that potentially correspond to the text responses. In particular, the additional topics may relate to the unknown or unassigned text responses.

Using the additional topics, the topic assigner 218 can reanalyze the unassigned text responses, and determine if any unassigned text responses correspond to one of the additional topics. When an unassigned text response corresponds to an additional topic, the topic assigner 218 can assign and/or code the text response to the additional topic. In addition, the topic assigner 218 can update the topic assignment report.

Further, in some embodiments, the topic assigner 218 analyzes previously assigned text responses to determine if the text responses also correspond to one of the additionally provided topics. In some cases, the topic assigner 218 can change/remove a previously assigned topic based on receiving the additional topic. For example, based on reanalyzing a previously assigned text response with the availability of the additional topic, the topic assigner 218 can determine that the connection of the text response to the additional topic is of sufficient strength that the previously assigned topic no longer is a useful match. In other words, when the topic assigner 218 did not have the additional topic, the topic assigner identified a topic that matched the text response at least at a minimum threshold level. With the availability of the additional topic, however, the topic assigner 218 can determine that the additional topic matches the text response at a level that exceeds the level of match of the previously assigned topic to such an extent that the topic assigner 218 removes the previously assigned topic from the text response and assigns the additional topic to the text response.

In some example embodiments, the topic assigner 218 uses the addition of one or more new text responses to add new topics and/or assess the strength of current topic assignment, as described above. For example, the topic assigner 218 updates topics based on new topics identified in additionally received responses. In other words, the topic assigner 218 can rebuild the probabilistic model when new responses are added, and using the rebuilt probabilistic model, the topic assigner 218 can re-evaluate the existing topic assignments and make changes. As such, in one or more embodiments, the topic assigner 218 uses the new topics to reevaluate and reassign topics to all responses. Alternatively, the topic assigner 218 uses the new topics to assign topics to the responses not yet assigned a topic. For instance, the topic assigner 218 prompts an administrator as to whether the topic assigner 218 should recode all responses or only responses having an unassigned/unknown topic code.

In analyzing or reanalyzing text responses, the topic assigner 218 may determine associations between text responses and topics based on matching content (e.g., a word or combination of words) between each topic. Matches may include exact matches or near matches. To illustrate an example of an exact match, upon the topic assigner 218 identifying the words "long wait" in a text response, the topic assigner 218 assigns the text response to the topic "wait time." As an example of a near match, upon the topic assigner 218 identifying any of the words "on hold," "long time," "forever," or "lengthy" in a text response, the topic assigner 218 assigns the text response to the topic of wait time. As described, the topic assigner 218 can use a probabilistic language model to identify matches or near matches.

In some embodiments, the topic assigner 218 determines a topic correlation score or value between a text response and each potential topic. The topic correlation score between a text response and a topic may be based on the occurrence frequency of a match or near match. In other words, a text response having few matches with a topic will have a lower topic correlation score for the topic than a text response having many matches with the topic.

As described above, in one or more embodiments, the topic assigner 218 can also employ a probabilistic language model to determine associations between text responses and topics. The topic assigner 218 can use a frequentist approach within the probabilistic language model to estimate correlations between a piece of content in a text response and other content in the text response, or content in the other text responses. As an overview, the probabilistic language model determines the probability that a given text response will generate a particular word if a user rewrote the text response with the same or similar number of, but potentially different, words. As such, the topic assigner 218 can use the probabilistic language model to identify a probability that each topic correlates with a particular text response.

As an advantage, the topic assigner 218 employs a probabilistic language model without requiring supervised training. By using a probabilistic language model, the topic assigner 218 determines the probability that a text response will correspond to a topic based on analyzing the text response and related text responses. In one or more embodiments, the topic assigner 218 assigns and/or codes a text response to one or more topics having a probabilistic language model probability over a threshold level (e.g., more likely to belong with to a topic than not). In some embodiments, the topic assigner 218 may assign and/or code a text response to the topic having the highest probabilistic language model probability.

In other embodiments, the topic assigner 218 uses probabilistic language model probabilities in addition with other factors to determine which topic or topics to assign to a text response. For example, the topic assigner 218 uses the probabilistic language model probabilities in connection with matches or near matches in a text response and/or other factors to determine a topic correlation score between the text response and a topic. The topic assigner 218 can then assign and/or code a text response to a topic when the text response has a topic correlation score above a threshold value. By comparing the topic correlation score for a response to a threshold value, the topic assigner 218 can guard against improperly assigning a text response to a topic to which the text does not properly correspond.

Further, using the topic correlation scores, the topic assigner 218 can also compare association strengths for a text response among corresponding topics. For example, the topic assigner 218 may determine that a text response is associated with three different topics. The topic assigner 218 can compare the topic correlation scores for the three topics and identify which topic has the highest topic correlation score. In the case that the topic assigner 218 assigns text responses to only one topic or selects a primary topic for a text response, the topic assigner 218 can select the topic having the highest topic correlation score. Further, in some instances, the topic assigner 218 can identify and report the topic to which the text response best corresponds, such as in the topic assignment report. Alternatively, the topic assigner 218 can include each topic to which a text response corresponds (i.e., has a topic correlation score above a threshold) in the topic assignment report.

The suggestion manager 220 can provide a user with suggested topics. For example, the suggestion manager 220 can analyze one or more text responses to identify various content groupings, such as a community of words, that relate to each other. Upon analyzing a community of words, the suggestion manager 220 can identify one or more prevailing topics. The suggestion manager 220 can then provide the one or more identified prevailing topics to the user as a suggested topic, and the user can select a suggested topic for the topic assigner 218 to pair with one or more text responses.

In some example embodiments, the suggestion manager 220 can automatically apply one or more of the identified prevailing topics to the user. For example, the suggestion manager 220 determines that 10% of the unassigned text responses correspond to the topic of "Product Quality." When providing the suggested topic of product quality to the user, the suggestion manager 220 can also include that 10% of the text responses correspond to the topic. In an alternative embodiment, the suggestion manager 220 may wait for a user to select the suggested topic before performing a real-time analysis of how well the suggested topic corresponds to text responses. Additional detail regarding generating and providing suggested topics is provided below.

As shown in FIG. 2, the content management system 106 may include a survey database 206. The survey database 206 may be made up of a single database or multiple databases. In addition, the survey database 206 may be located within the content management system 106. Alternatively, the survey database 206 may be external to the content management system 106, such as in cloud storage. Further, the survey database 206 may store and provide data and information to the content management system 106, as further described below.

The survey database 206 may include surveys, such as surveys created via the survey manager 202. Further, the survey database 206 may also include surveys imported from third-party sources. In addition, the survey database 206 may store information about each survey, such as parameters and preferences that correspond to each survey. For example, when a user creates a survey and specifies that the survey be administered via a selected distribution channel, the survey database 206 may record the user's specified selection.

Each survey may have a survey identifier (or simply "survey ID") to provide unique identification. In some cases, the surveys may be organized according to survey ID. Alternatively, surveys in the survey database 206 may be organized according to other criteria, such as creation date, last modified date, closing time, most recent results, etc. Further, the survey database 206 may associate access codes with a survey ID, such that the content management system 106 can identify to which survey a response corresponds when the response includes an access code.

In some embodiments, the survey database 206 may include a record of survey questions and responses (e.g., text responses). Each question may have a unique question identifier (or simply "question ID"). In some cases, the question ID may also identify the survey to which the question belongs. In addition, the survey database 206 may include a cumulative set of responses for a survey question. Further, each response may have a unique results identifier (or simply "result ID"). In some instances, the result ID may identify the survey and/or the question to which the result corresponds. For instance, based on the result ID, the content management system 106 is able to identify the corresponding question and/or the survey.

Figure 3:
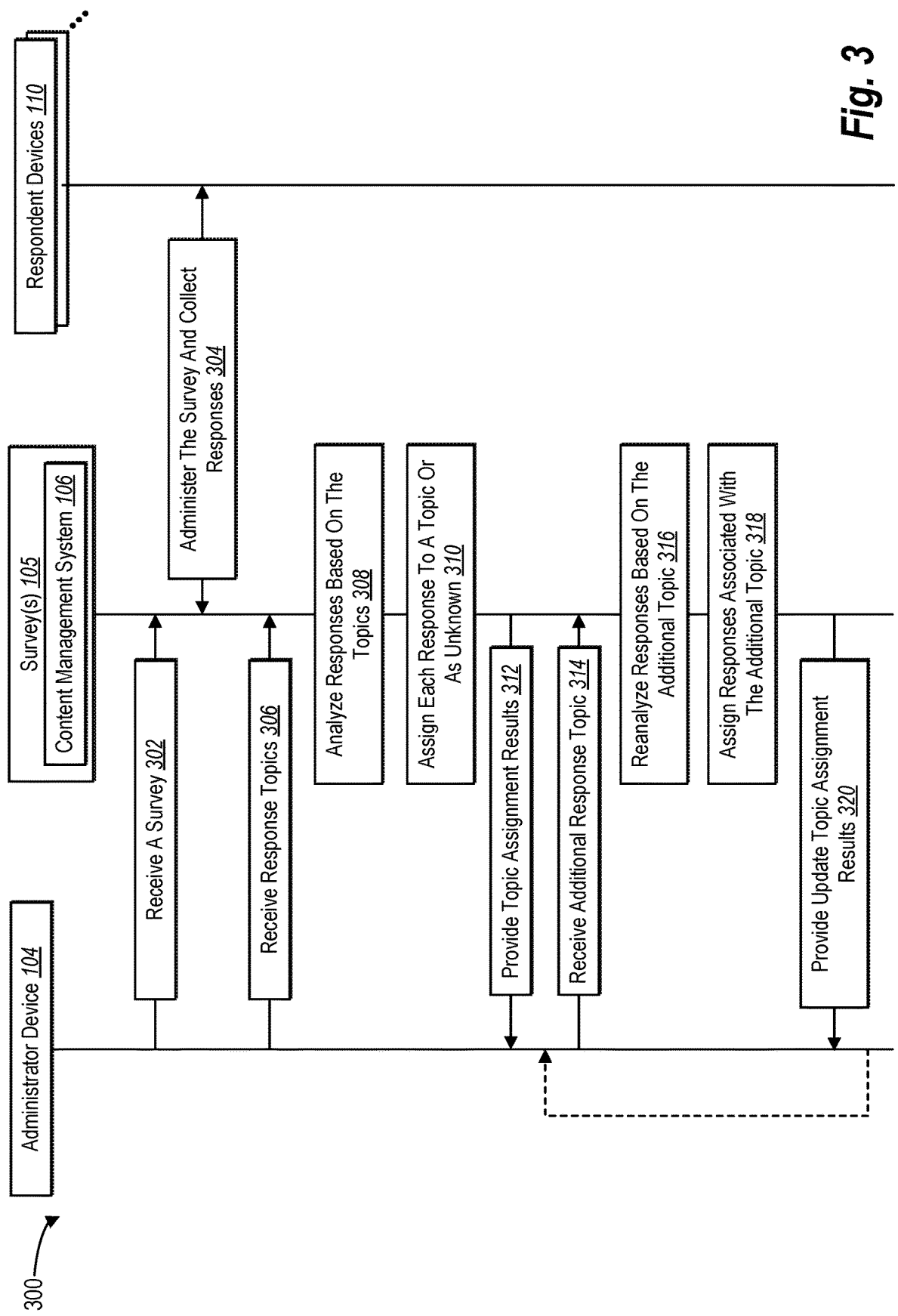
FIG. 3 illustrates a sequence-flow diagram of interactions between the administrator device, the content management system, and one or more respondent devices in accordance with one or more embodiments.

Referring now to FIG. 3, which illustrates a sequence-flow method 300 of interactions between the administrator device 104, the content management system 106, and one or more respondent devices 110. The sequence-flow method 300 of FIG. 3 illustrates an example timeline of interactions between the administrator device 104, the content management system 106, and the one or more respondent devices 110 described above in connection with FIGS. 1 and 2.

As shown in step 302, the content management system 106 receives a survey from the administrator device 104. In particular, an administrator using the administrator device 104 can create a survey and provide the survey to the content management system 106. The survey can include any number of free-form text response questions in addition to other types of survey questions. In some example embodiments, the administrator creates a survey on the content management system 106, as described above.

In step 304, the content management system 106 can administer the survey to one or more recipients and collect responses to the survey. More specifically, the content management system 106 can provide the survey to the one or more respondent devices 110. The content management system 106 can provide the survey over a number of different distribution channels. For example, the content management system 106 can provide the survey online, via text message, or via electronic message.

A respondent using one of the respondent devices 110 can complete the survey. For example, upon a respondent receiving an open-ended question asking the respondent about his or her experience with a product, the respondent may provide feedback in the form of a text response. Upon a respondent providing responses to survey questions, the content management system 106 can collect and store the responses, as described above.

As step 306 illustrates, the content management system 106 can also receive response topics from the administrator device 104. In particular, an administrator using the administrator device 104 can provide a list of one or more topics to the content management system 106 that potentially relates to the one or more text responses from the respondents. The administrator may specify if the content management system 106 should use the list of topics to organize text responses from a single survey question or text responses from multiple survey questions.

In general, the administrator has an initial understanding of the type of responses that respondents may provide given the various survey questions. For example, if the survey is regarding a product, the administrator may anticipate text responses regarding product quality, customer service, technical support, etc. If the survey is regarding a restaurant, the administrator may anticipate text responses regarding food quality, the wait staff, cleanliness of the restaurant, etc. As such, the administrator can provide one or more topics to the content management system 106 in connection with the survey. In some embodiments, the administrator provides the list of topics for text responses to a survey question when creating the survey question. In addition, the administrator may later add or remove topics from the list of topics.

Upon receiving the list of topics, the content management system 106 can analyze currently received and/or future text responses using the topics, as shown in step 308. More specifically, for each text response, the content management system 106 can determine a correlation between the text response and the topics on the list of topics. In some cases, the content management system 106 can compare a text response to each of the topics in a parallel process. In other cases, the content management system 106 compares each text response to each topic separately. In either case, the content management system 106 can determine that one or more topics correspond to a text response.

While the topics on the list of topics correlate with many of the potential issues found in a text response, in some instances, a text response may not correlate to any of the topics on the list of topics. For example, a text response can address an emerging issue that the administrator did not previously envision. In these instances, the content management system 106 may not be able to determine a correlation between the text response and any of the topics on the list of topics, or may determine that the correlation between the text response and the topics is below a threshold value (e.g., any identified correlation to a topic is too weak).

Once the content management system 106 determines a correlation between a text response and one or more topics, the content management system 106 can assign the text response to the corresponding topic, as shown in step 310. Also, as shown in step 310, the content management system 106 can assign a text response as unknown when the content management system 106 determines that the text response did not correspond to any of the current topics. In some embodiments, the content management system 106 can assign a text response to a topic by coding the text response with a code representing the topic to which the text response corresponds. For example, if a text response corresponds to Topic 1, the content management system 106 can assign the text response to Topic 1 by coding the text response with 001 in an attribute associated with the topic of the text response. By assigning and/or coding each text response to a topic or as unknown, the content management system 106 can arrange the text response in an organized manner.

Further, once the text responses are analyzed and one or more topics are assigned, the content management system 106 can compile results of the assignments and provide the topic assignment results to the administrator, as step 312 illustrates. For instance, the content management system 106 can use the codes of each text response to identify the number of text responses coded to each topic. Then, as part of the topic assignment results, the content management system 106 can include the number or percentage of results that do not correspond to a topic (e.g., topic unknown). FIG. 5 displays an example of topic assignment results for text responses to one or more survey questions.

In step 314, the administrator can provide one or more additional response topics to the content management system 106. As an example, upon the administrator viewing the topic assignment results and/or one or more of the text responses, the administrator may provide the content management system 106 with additional topics. For instance, the administrator may review one or more of the unassigned text responses (e.g., a text response with the topic unknown) and identify one or more topics that are not included in the current list of topics.

Using the additional topic(s), the content management system 106 can reanalyze the text responses, as shown in step 316. In particular, the content management system 106 reanalyzes the unassigned text responses using the additional topics. In additional embodiments, the content management system 106 also reanalyzes all text responses for a survey question or survey questions to determine whether a correlation exists between the text response and an additional topic provided by the administrator. For example, the content management system 106 can determine that a text response previously assigned to one topic has a stronger correlation to the topic provided by the administrator.

As step 318 illustrates, if the content management system 106 determines a correlation, the content management system 106 can assign the text response to the corresponding additional topic, as described above. In addition, the content management system 106 can update the topic assignment results to reflect the updated assignments. Further, the content management system 106 can provide updated topic assignment results to the administrator, as shown in step 320.

Steps 314 through 320 can repeat as long as the administrator continues to provide additional topics to the content management system 106. Each time the administrator provides an additional topic (step 314), the content management system 106 reanalyzes the text responses (step 316), updates assignments (step 318), and updates the topic assignment results provided to the administrator (step 320).

In addition, in some embodiments, the administrator can delete or remove topics from the list of topics. In a similar manner, the content management system 106 can update the topic assignment results (e.g., recode a text response coded to the removed topic as unknown or as another topic to which the text response corresponds) and provide the updated results to the administrator.

Further, while not shown in the sequence-flow method 300, the content management system 106 can receive additional text responses at any time, as described above. When the content management system 106 receives an additional text response, the content management system 106 can update and/or modify the probabilistic model using the additional data found in the additional text response. Thus, in additional to receiving additional topics, the content management system 106 can also use the additional text responses to improve the accuracy of the content management system 106 assigned responses to topics.

Figure 4:
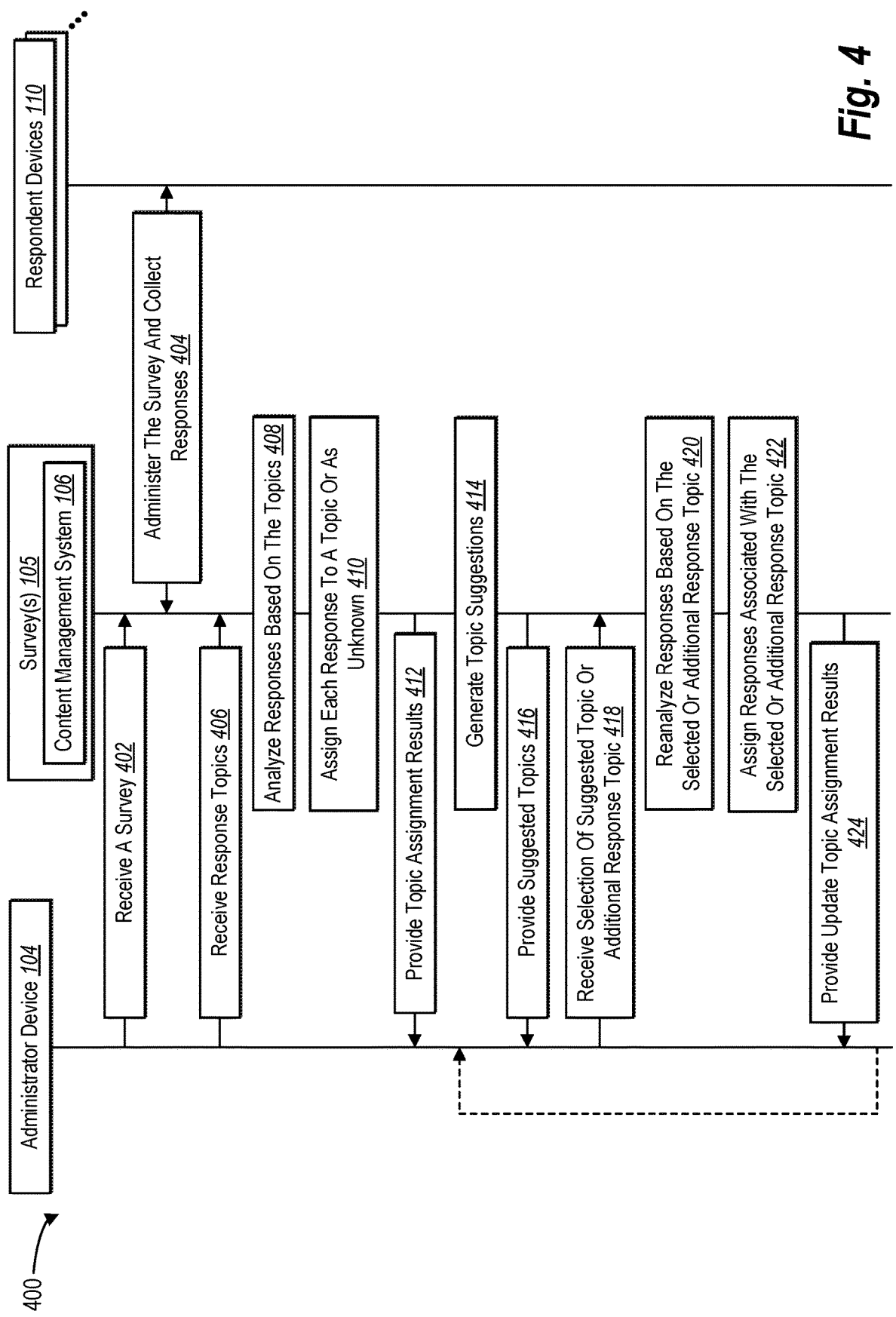
FIG. 4 illustrates a sequence-flow method showing the content management system providing suggested topics to an administrator in accordance with a number of embodiments.

FIG. 4 illustrates a sequence-flow method 400 showing the content management system 106 providing suggested topics to an administrator. The administrator device 104, content management system 106, and the respondent devices 110 shown in FIG. 4 may each be example embodiments of the administrator device 104, content management system 106, and the respondent devices 110 described with respect to FIGS. 1 and 2.

In addition, a number of steps in FIG. 4 can repeat corresponding steps described with respect to FIG. 3. For example, steps 402-412 in FIG. 4 may replicate corresponding steps 302-312 from FIG. 3. Thus, as described above in greater detail, the content management system 106 can receive a survey from an administrator (step 402), administer the survey to respondents and collect responses (step 404), and receive response topics from the administrator (step 406). Further, the content management system 106 can analyze responses based on the received topics (step 408), assign each response to a topic or as unknown (step 410), and provide topic assignment results to the administrator (step 412), as described above in connection with FIG. 3.

In step 414, the content management system 106 can generate topic suggestions. In particular, the content management system 106 can generate one or more topic suggestions based on analyzing the unassigned text responses. Additionally, the content management system 106 can also use text responses from assigned text responses when determining topic suggestions. To generate suggested topics, the content management system 106 can identify communities of words based on one or more text responses. Then, using the community of words, the content management system 106 can identify a prevalent word in each community of words as suggested topics. In general, the content management system 106 should identify topics that are actionable (e.g., promotes action by the administrator), focused (e.g., has high precision and recall), and provide significant coverage (e.g., matched to a significant number of text responses).

In some example embodiments, the step 414 of generating topic suggestions occurs after the step 404 of administering the survey and collecting responses, in connection with generating topic models. In other embodiments, the sequence-flow method 400 can skip steps 406-412 and go directly from the step 404 of administering the survey and collecting responses to the step 414 of generating topic suggestions.

In one or more embodiments, the content management system 106 analyzes multiple text responses and uses the blended data set to generate topic suggestions and/or assign topics to text responses. To illustrate, the content management system 106 may administer two surveys, where one survey is sent to breakfast diners and the other survey is sent to lunch diners. Both surveys, however, have a question asking the diners about their opinion of the company and/or dining experience. Even though the two questions are from different surveys, the content management system 106 can analyze responses from both surveys as a single dataset.

As shown in step 416, the content management system 106 can provide suggested topics to the administrator. In some example embodiments, the content management system 106 also provides an indication of how many text responses correspond with each of the suggested topics. Then, once the administrator receives the suggested topic via the administrator device 104, the administrator can select one or more of the suggested topics. Alternatively, the administrator can provide one or more new or additional topics, as described above with respect to FIG. 3. Accordingly, when the administrator selects one of the suggested topics or provides an additional response topic, the content management system 106 receives the selection of the suggested topic or additional response topic, as shown in step 418.

Using the selected suggested topic(s) and/or the additional response topic(s), the content management system 106 can reanalyze the text responses, as shown in step 420. In particular, the content management system 106 reanalyzes the unassigned text responses using the selected suggested topics and/or the additional response topic. In addition, the content management system 106 can reanalyze all text responses for a survey question or survey questions to determine whether a correlation exists between previously assigned text responses and a suggested topic selected by the administrator and/or an additional response topic provided by the administrator.

As step 422 illustrates, upon the content management system 106 determining a correlation with a selected suggested topic and/or additional response topic, the content management system 106 can assign the text response to the selected suggested topic and/or additional response topic, as described above. In addition, the content management system 106 can update the topic assignment results to reflect the updated assignments. Further, as step 424 shows, the content management system 106 can provide updated topic assignment results to the administrator.

Steps 414 through 424 can repeat as long as the administrator continues to select suggested topics. Each time the administrator selects a suggested topic, the content management system 106 reanalyzes the text responses, updates assignments, and updates the topic assignment results provided to the administrator. In some example embodiments, steps 414 through 424 repeat until every text response is assigned to a topic (i.e., no text responses are marked as unknown).

FIG. 5 illustrates an example graphical user interface 500 (or "GUI 500") that displays a results dashboard for text responses to one or more survey questions. In particular, the results dashboard can include a graph of topic assignments 502 (e.g., topic assignment results) corresponding to a plurality of topics 504. The results dashboard also displays suggested topics 506 as well as a field to add topics 508. In addition, the results dashboard displays the number of responses 510 to which the results correspond. The results dashboard in FIG. 5 corresponds to free-form text responses for one or more survey questions about a customer's restaurant experience. For example, the text responses may be in answer to the question "How was your overall experience at Restaurant A?" or "What would improve your dining experience?" Thus, as shown in FIG. 5, the topics 504 correspond to a customer's dining experience.

The content management system 106 can arrange topic assignments within the results dashboard based on a variety of configurations. For example, the content management system 106 can arrange the topic assignments by assignment (e.g., assigned versus unassigned), alphabetically, by size, or as specified by an administrator. As shown in FIG. 5, the topic assignments 502 are organized based on a combination of factors. More specifically, topic assignments over 5% (e.g., dirty, food, menu, service, staff, and wait) are shown first and topic assignments under 5% (e.g., bathroom, beef, and overcooked) are group together in an "other" category secondly. Further, as shown in FIG. 5, the topics 504 are displayed below the topic assignments 502 and are arranged to reflect the order of the topic assignments 502 (e.g., dirty, food, menu, service, staff, wait, bathroom, beef, and overcooked).

In many embodiments, unknown/unlabeled topic assignments are displayed separately, regardless of the size of the unknown topic assignments. For example, the content management system 106 displays, within a graphical user interface, unknown/unlabeled topics before displaying known topics. For instance, the content management system 106 displays the number of responses that have an unknown/unlabeled topic in a defined portion of a graphical user interface to allow a user to quickly locate and understand the number of responses that have an unknown/unlabeled topic assignment. As another example, the content management system 106 provides a chart displaying a breakdown (e.g., percentage) between unknown/unlabeled topics and known topics. Further, upon the content management system 106 assigning each unknown/unlabeled topic, the content management system 106 only indicates the percentage of responses assigned to a topic.

In one or more embodiments, the administrator uses the add topic option 508 to provide one or more topics to the content management system 106. In other embodiments, the administrator can upload or link to a list of topics via the add topic option 508. Alternatively, in some embodiments, the content management system 106 uses a preexisting list of topics, such as a list of topics maintained by the content management system 106.

Just as an administrator can provide a list of topics to the content management system 106, the administrator can also remove topics from the list of topics. For example, each topic can include an option that removes the topic from the list of topics. To illustrate, each topic displayed in FIG. 5 includes a selectable element represented by an "x" that, when selected, removes the topic from the list of topics. For example, the administrator may remove the topic "bathroom" from the list of topics. Further, the administrator can manually combine two topics together (e.g., drag one topic into another topic), or request that the content management system 106 separate a topic into multiple topics (e.g., request that the topic of food be separated into appetizers, entrées, desserts, and drinks).

As the administrator adds and removes topics, the content management system 106 can update the GUI 500 displaying the results dashboard. For example, if the content management system 106 is set to allow only one topic per response, upon the user removing the topic "wait," the content management system 106 can reanalyze and reassign the text responses formally assigned to the topic. For instance, the content management system 106 can reassign 3% of the wait responses to the topic "service," 1% to the topic "coffee" and the remainder of text responses formally assigned as "wait" as unknown.

As shown in FIG. 5, the GUI 500 can include suggested topics. The suggested topics may provide the administrator with potential emerging topics that the administrator has not previously considered. For example, if a number of text responses include comments about a change in food quality, the content management system 106 can identify the trend and provide the topic of food quality or quality to the administrator.

The suggested topics 506 may be ordered according to correlation strength (e.g., based on analysis with the remaining unknown text responses), frequency of occurrence (e.g., how often the word appears in the text responses), ordered alphabetically, or ordered randomly. Further, the content management system 106 may display only a limited number of suggested topics within the results dashboard. For example, the content management system 106 may display only suggested topics that meet a threshold correlation strength or relevance. In other cases, the content management system 106 may display a limited number of suggested topics (e.g., ten or less).

The administrator can select a suggested topic 506 to add the topic to the topics 504. As described above, when the administrator selects a suggested topic 506, the content management system 106 can reanalyze the text responses, and update the results dashboard in the GUI 500. In some embodiments, the content management system 106 updates the results dashboard in real-time or near real time.

Rather than adding a suggested topic 506, the administrator can select an option to remove the suggested topic. For example, the administrator may remove the suggested topic "love" from the suggested topics. Upon removing the suggested topic, the content management system 106 can provide a replacement suggested topic. Further, in some instances, the content management system 106 can negatively weigh topics associated with the removed suggested topic. As a result, the content management system 106 may reanalyze and reconsider other suggested topics that are tied to the removed suggested topic. For instance, upon removing the suggested topic "love," the content management system 106 may also remove "favorite" from the list of suggested topics.

By using the results dashboard, an administrator can view a summary of text responses organized by topic assignment 502. In addition, the administrator can use the suggested topics 506 to identify emerging topics within text responses. Further, the administrator can use the suggested topics 506 to identify topics that the administrator may have missed that are included in text responses coded as unknown.

In one or more embodiments, the GUI 500 can include a search field. Using the search field, an administrator can filter the topic assignments 502 to assignments that match the search criteria. Further, in some example embodiments, the search field can search and/or filter the content within text responses and display the topic assignments results corresponding to the identified text responses. For example, the administrator may use the search field to apply a filter to only display topic assignments corresponding to text responses that are provided by respondents between the ages of 18-25.

As mentioned above, the content management system 106 can use a probabilistic language model to identify correlations between text responses and topics. Further, the content management system 106 can use the model to identify suggested topics to provide to a survey administrator. In addition, by using the probabilistic language model, the content management system 106 can minimize the challenges of polysemy and synonymy, described above. The following description provides various embodiments of building and using the probabilistic language model.

In one or more embodiments, the probabilistic language model is based on a probability matrix and can be built using Latent Dirichlet Allocation (LDA). To illustrate, the content management system 106 can build a probability matrix that includes rows of words and columns of electronic text documents (i.e., a word-document probability matrix), expressed as P(w|d). In particular, the content management system 106 builds the probability matrix P(w|d) from a word occurrence-document matrix, a topic-word matrix, and a topic-document matrix. The word occurrence-document matrix includes words or terms that are used in the electronic text documents. The word occurrence-document matrix is expressed as $B_{occ}(w|d)$, where occ is occurrence, w is a single word or term, and d is an individual electronic text document. The topic-word matrix includes a values for the Dirichlet distribution. The topic-word matrix is expressed as $\alpha_{lda}(w|z)$, where w is the single word or term and z is an LDA topic. The topic-document matrix also includes $\alpha$ values for the Dirichlet distribution. The topic-document matrix is expressed as $\alpha_{lda}(z|d)$, where z is the LDA topic and d is an individual electronic text document. Within the context of LDA matrices, topics refer to latent topics discovered by the algorithm and are not the "topics" that humans assign to responses as otherwise disclosed herein. In the LDA sense, a topic can be thought of as a type of probabilistically derived cluster.

Using the word occurrence-document matrix $B_{occ}(w|d)$, the topic-word matrix $\alpha_{lda}(w|z)$, and the topic-document matrix $\alpha_{lda}(z|d)$, the content management system 106 computes three additional matrices, which are used to compute the probability matrix P(w|d). More specifically, the three additional matrices are a most likely word given a document matrix $P_{ML}(w|d)$, a most likely word given a collection of documents matrix $P_{ML}(w|coll)$, and an LDA-based word given the document matrix $P_{lda}(w|d)$ (where "ML" represents most likely and "coll" represents collection). Thus, as part of the probabilistic language model, the content management system 106 computes the most likely estimate probability of a word given an electronic text document, the most likely estimate probability of a word given a collection of electronic text documents, and the LDA-based probability of a word given the electronic text document.

In various embodiments, to compute the most likely word given a document matrix $P_{ML}(w|d)$, the content management system 106 uses a frequentist approach. In particular, the content management system 106 determines the most likely estimate probability of a word in a document based on the ratio of appearances of that word in the document to the total number of words in the document. Computing the most likely word given a document matrix $P_{ML}(w|d)$ is shown mathematically as the equation:

$$P_{ML}(w|d) = \frac{B_{occ}(w|d)}{\sum_{w \in W} B_{occ}(w|d)} \quad (1)$$

Thus, given the word occurrence-document matrix $B_{occ}(w|d)$, the content management system 106 can generate the most likely word given a document matrix $P_{ML}(w|d)$ by dividing each element within the matrix by the sum of elements within the same row. As a note, in the case of empty electronic text documents, the content management system 106 determines a probability of zero for all words.

In addition, to compute the most likely word given a collection of electronic text documents matrix $P_{ML}(w|coll)$, the content management system 106 again uses a frequentist approach. More specifically, the content management system 106 determines the most likely estimate probability of a word given the collection based on the number of appearances of that word given the corpus, or collection of electronic text documents, divided by the total number of words appearing in the corpus. Computing the most likely word given a collection of documents matrix $P_{ML}(w|coll)$ is shown mathematically as the equation:

$$P_{ML}(w|coll) = \frac{\sum_{w \in D} B_{occ}(w|d)}{\sum_{w \in W, d \in D} B_{occ}(w|d)} \quad (2)$$

Thus, given the word occurrence-document matrix $B_{occ}(w|d)$, the content management system 106 can generate the $P_{ML}(w|coll)$ column vector by summing each row and dividing each row by the sum of all entries within the matrix.

Further, the content management system 106 computes the LDA-based word given the document matrix $P_{lda}(w|d)$ based on the LDA-based probability of a word, given the electronic text document. In particular, for a given topic z, the probability of a word given an electronic text document is shown as the equation:

$$P_{lda}(w|d) = P_{lda}(w|z)P_{lda}(z|d) \quad (3)$$

and over all topics as the equation:

$$P_{lda}(w|d) = \sum_{z=1}^{K} P_{lda}(w|z)P_{lda}(z|d) \quad (4)$$

To compute the probability of a word given an electronic text document for all words and documents, given the two LDA matrices, Equation 4 provides the equation:

$$P_{lda}(w|d) = P_{lda}(w|z)^T P_{lda}(z|d) \quad (5)$$

where T is the transpose operator. In addition, to convert a Dirichlet $\alpha$ value into a probability, the content management system 106 divides the a value by the sum of $\alpha$ values in that probability space.

Using the most likely word given a document matrix $P_{ML}(w|d)$, the most likely word given a collection of documents matrix $P_{ML}(w|coll)$, and the LDA-based word given the document matrix $P_{lda}(w|d)$, the content management system 106 can compute the probability matrix $P(w|d)$. In particular, the content management system 106 can compute the probability matrix $P(w|d)$ using the following equation:

$$P(w|d) = \left( \frac{N_d}{N_d + \mu} P_{ML}(w|d) + \left(1 - \frac{N_d}{N_d + \mu}\right) P_{ML}(w|coll) \right) + P_{lda}(w|d) \quad (6)$$

In Equation 6, $\mu$ parameter smoothes between words appearing in a document and their overall likelihood to appear (as if the electronic text documents could grow in size). The $N_d$ parameter refers to the total number of documents within the corpus.

To code and/or assign a topic to an electronic text document, as described above, the content management system 106 can use the probability matrix $P(w|d)$. Specifically, using the probability matrix $P(w|d)$ and the list of topic search queries, the content management system 106 can create a mapping from each electronic text document in d to the union of the topic search query, or to a special "unknown" bucket (e.g., an unassigned topic). In general a search query can include a connected set of clauses, where each clause contains one or more query terms (words that appear in the probability matrix $P(w|d)$ vocabulary), and the connections between clauses constitute OR'ed ($\vee$) relations. Within each clause, the query terms are implicitly AND'ed ($\wedge$) together. In this manner, additional query terms within a clause narrow the selection of electronic text documents, while additional clauses broaden the selection of electronic text documents. As a note, one will appreciate that the content management system 106 may add a NOT ($\neg$) operator as well as other logical operators, however, corresponding equations are not disclosed herein.

In one or more embodiments, the AND and OR queries are not true "Boolean" queries because the content management system 106 uses probabilistic models. As such, every topic has a positive probability, although it may be a very low probability of appearing in an electronic text document. To overcome this issue, the content management system 106 uses the AND and OR queries in a similar manner as used in reliability theory, where two events happen concurrently or exclusively of each other.

In addition, for each term, the content management system 106 calculates $P_a(q|d)$. In general, the probability matrix $P(w|d)$ provides the probability of a word being generated, given an electronic text document. Since electronic text documents usually contain multiple words, the probability of that word appearing increases as the length of the electronic text document increases. Accordingly, the content management system 106 can compute the probability of the query term appearing in an electronic text document of length L, $P_a(q|d)$, via the Bernoulli distribution as the equation:

$$P(q|d) = 1 - (1 - P_{lda}(q|d))^L \quad (7)$$

In many embodiments, the content management system 106 uses a constant length (L) for all electronic text documents.

The content management system 106 can compute the ANDS within a clause. For example, the probability of two independent events happening simultaneously is the product of the two probabilities, or a $\wedge$ b=ab. Similarly, the content management system 106 can compute the ORs between clauses. For instance, the probability of either one of two independent events happening simultaneously is the sum of the two probabilities minus the co-occurrence probability, or a $\vee$ b=a+b−ab.

The content management system 106 can compute $\Omega(d|q)$ and select the bucket. In particular, using the combined $P_a(q|d)$ for a query, the content management system 106 can calculate the odds ratio, $\Omega$, that the document matches the query via the equation:

$$\Omega(d \mid q) = \frac{P_a(q \mid d)}{1 - P_a(q \mid d)} \qquad (8)$$

As a note, the odds ratio is abbreviated as $\Omega$ rather than OR to avoid confusion with the logical "OR." Further, for numerical accuracy and speed, the content management system 106 can use the logarithms of the odds rather than the odds themselves. As such, the logarithmic odds is equal to the equation:

$$\Omega_{log}(d|q) = \log P_a(q|d) - \log(1 - P_a(q|d)) \qquad (9)$$

The content management system 106 can also use the probability matrix $P(w|d)$ to provide suggested topics. The following provides one or more embodiments describing how the content management system 106 identifies suggested topics using the probability matrix $P(w|d)$.

As, the initial input, the content management system 106 takes probability matrix $P(w|d)$, where each entry in the matrix is the approximate probability that a particular electronic text document will generate a particular word if the electronic text document is extended by one word. The probability matrix $P(w|d)$ is multiplied by the transpose of itself, which gives a symmetric word by word matrix, A. The symmetric word by word matrix A is treated as a weighted adjacency matrix.

To eliminate low-strength linkages between words and reduce computational time, in some embodiments, the content management system 106 can eliminate values below a predefined noise threshold parameter. Then, using the weighted adjacency matrix after the threshold is applied, the content management system 106 can find communities of words. In particular, the content management system 106 can convert the weighted adjacency matrix into a graph containing various word communities. As an overview, a community is defined as a grouping of nodes that are more tightly joined internally than externally. A community of words can include a single word or multiple words.

The content management system 106 can define and detect a community in a variety of ways within a graph. In one embodiment, the content management system 106 uses modularity to define and detect a community of words. Thus, to find communities within the graph, the content management system 106 can use a Louvain Modularity algorithm, which is an iterative algorithm. To illustrate, the content management system 106 can initially assign each node as its own community. Next, the content management system 106 can repeat the following two phases until the modularity of the network is maximized. In Phase 1, for all non-empty communities, the content management system 106 tests if moving the contents of the community to a neighboring community nets an improved modularity. If so, the content management system 106 moves the contents to the modularity-maximizing neighbor. In Phase 2, the content management system 106 builds a new network using the new communities.

From this process, the content management system 106 can arrive at a list of communities. In some embodiments, the content management system 106 deletes communities that include only a single member since a community with a single member (e.g., word) suggests that the word, although perhaps prevalent in the source text, is not commonly joined with other words and thus may not provide high relevancy.

To illustrate. Table 1 below provides an example of sample community structures:

TABLE 1

Example Communities

| # | Members and Strengths |
|---|---|
| 1 | service: 2.4, security: 1.8, price: 0.8 |
| 2 | product: 2.3, competitor: 1.5, policy: 0.6 |
| 3 | quality: 1.4, issue: 1.3 |

In Table 1, the strength of the word can be the value (e.g., non-negative real values) along the diagonal of the adjacency matrix where the row/column index matches the word.

To display suggestions to the end user, the content management system 106 first removes any words that have been adopted as a topic (or used within the list of topics). Secondly, the content management system 106 sorts the communities by their strongest remaining word. Third, the content management system 106 displays up to n suggestions, as described above in connection with FIG. 5. To illustrate, as shown in the suggested topics 506 in FIG. 5, the word "service" does not appear in the suggested topics 506 because it is included as one of the current topics 504. The content management system 106, however, does provide the words "product" and "quality" as suggested topics. Further, because the words "security" and "price" are tied to the word "service," within a community of words, the content management system 106 can assign electronic text documents (e.g., text responses) with these words to the service topic.

Figure 6:
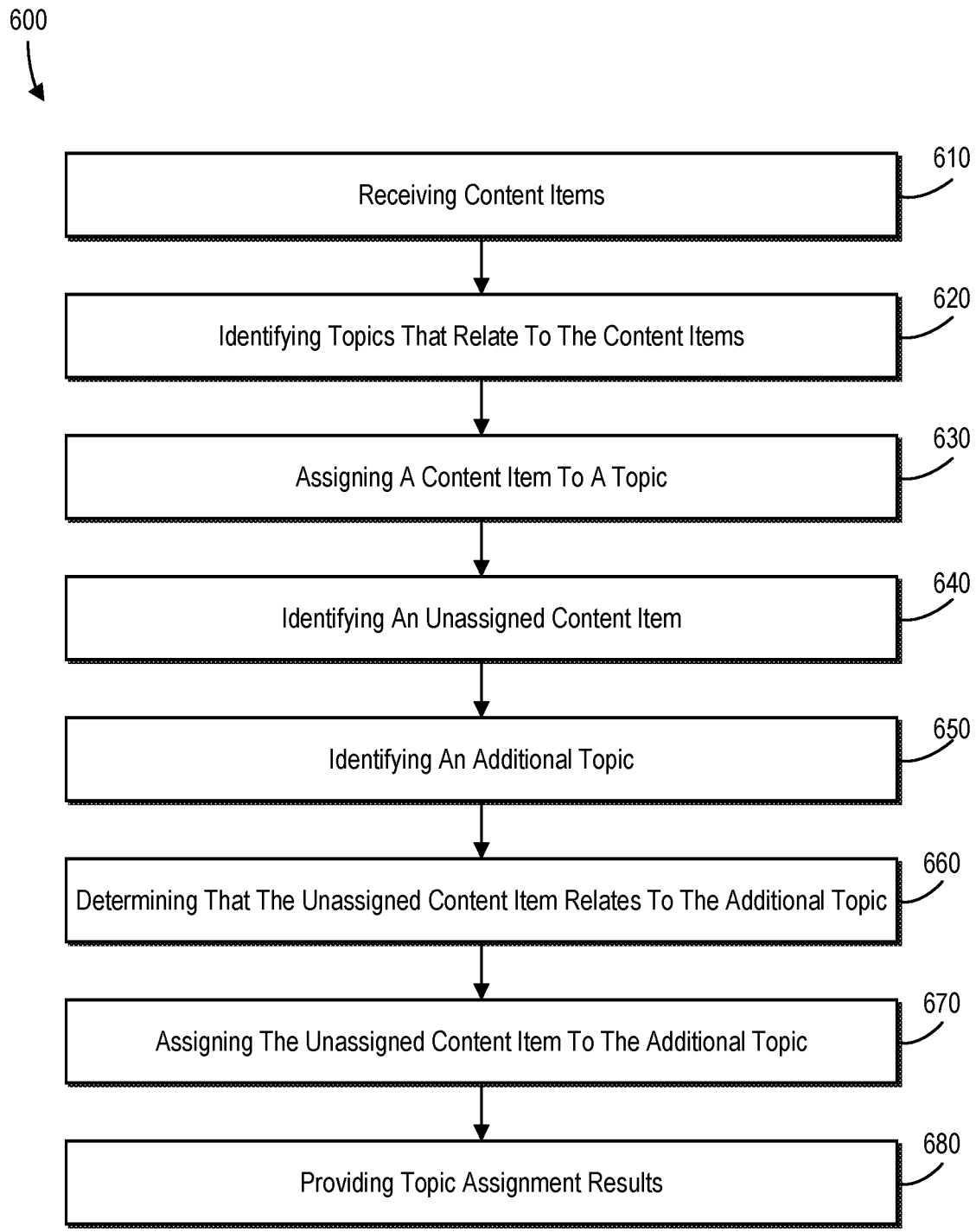
FIG. 6 illustrates a flowchart of a series of acts in a method for organizing content items in accordance with various embodiments.
Figure 7:
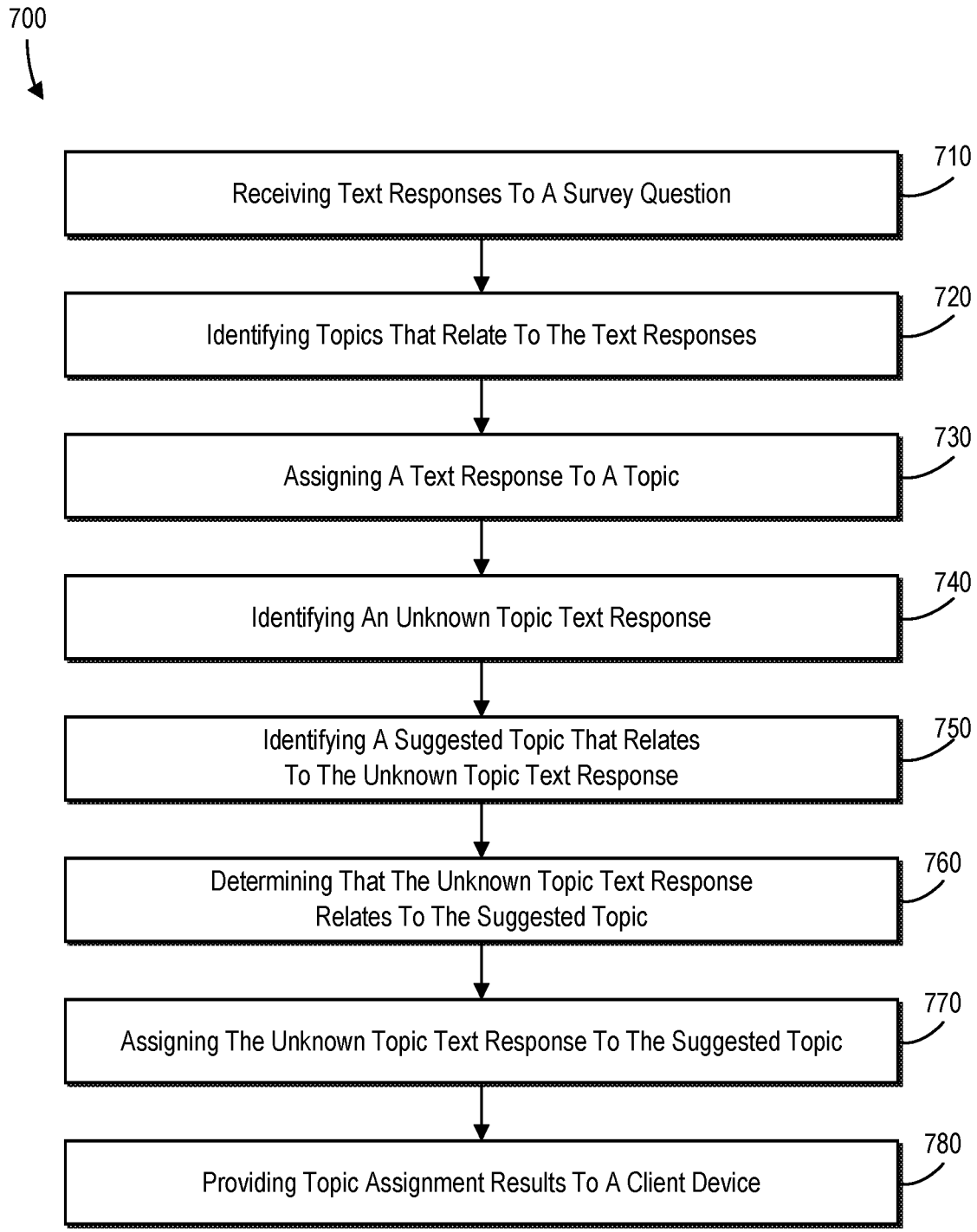
FIG. 7 illustrates a flowchart of a series of acts in a method for organizing survey responses in accordance with one or more embodiments.

FIGS. 1-5, the corresponding text, and the examples, provide a number of different systems, devices, and graphical user interfaces for organizing electronic text documents. In addition to the foregoing, embodiments disclosed herein also can be described in terms of flowcharts comprising acts and steps in a method for accomplishing a particular result. For example, FIGS. 6-7 illustrates flowcharts of exemplary methods in accordance with one or more embodiments disclosed herein. The methods described in relation to FIGS. 6-7 can be performed with less or more steps/acts or the steps/acts can be performed in differing orders. Additionally, the steps/acts described herein can be repeated or performed in parallel with one another or in parallel with different instances of the same or similar steps/acts.

FIG. 6 illustrates a flowchart of a method 600 for organizing content items in accordance with one or more embodiments. The method 600 can be implemented by the content management system 106 described above. The method 600 includes an act 610 of receiving content items. In particular, the act 610 involves receiving a plurality of content items. The content items can be electronic text documents, and more specifically, text responses. For example, one or more text responses may be provided by a recipient answering a survey response to a survey question of an electronic survey.

The method 600 also includes an act 620 of identifying topics that relate to the content items. In particular, the act 620 can involve identifying one or more topics that potentially relate to the plurality of content items. In some embodiments, a user provides the one or more topics. For example, the act 620 can include providing, to a client device associated with a user, a topic prompt for the one or more topics, and receiving, from the client device in response to the topic prompt, the one or more topics that potentially relate to the plurality of content items. Alternatively, identifying one or more topics that potentially relate to the plurality of content items includes accessing one or more topics stored in a database. For instance, the act 620 can include identifying the one or more topics from a stored list of topics.

In addition, the method 600 includes an act 630 of assigning a content item to a topic. In particular, the act 630 can involve assigning one or more content items within the plurality of the content items to the one or more topics. For example, the act 630 can include analyzing the plurality of content items to determine which content items of the plurality of content items correlate to the one or more topics. In some embodiments, the act 630 can also include using a topic probability model to determine which content items of the plurality of content items correlate to the one or more topics.

Further, the method 600 includes an act 640 of identifying an unassigned content item. In particular, the act 640 can involve identifying an unassigned content item from the plurality of content items that is unassigned to the one or more topics. For instance, the act 640 can involve identifying a content item whose assignment is unknown. In one or more embodiments, the method 600 can also include providing, to the client device, an indication of the unassigned content item. Further, in some embodiments, the method 600 can involve grouping unassigned content items in an unknown topic group.

The method 600 also includes an act 650 of identifying an additional topic. In particular, the act 650 can involve identifying, based on identifying the unassigned content item, an additional topic that potentially relates to the plurality of content items. For example, in some embodiments, the act 650 can involve providing, to the client device, an additional topic prompt for the additional topic, and receiving, from the client device in response to the additional topic prompt, the additional topics. Further, the act 650 can include adding the additional topic to the stored list of topics.

Additionally, the method 600 includes an act 660 of determining that the unassigned content item relates to the additional topic. In some embodiments, the act 660 can include using a probabilistic language model to determine that the unassigned content item relates to the additional topic. Further, the method 600 includes an act 670 of assigning the unassigned content item to the additional topic. The act 670 may assign the unassigned content item to the additional topic, as described above in connection with the act 630.

Further, the method 600 also includes an act 680 of providing topic assignment results. In particular, the act 680 can involve providing topic assignment results organized by the one or more topics and the additional topic. For example, the act 680 can involve providing a graphical user interface to a user that includes the topic assignment results.

FIG. 7 illustrates a flowchart of a method 700 for organizing survey responses in accordance with one or more embodiments. The method 700 can be implemented by the content management system 106 described above. The method 700 includes an act 710 of receiving text responses to a survey question. In particular, the act 710 involves receiving a plurality of text responses to a survey question. The text responses may be provided by a recipient answering a survey question of an electronic survey.

The method 700 also includes an act 720 of identifying topics that relate to the text responses. In particular, the act 720 can involve identifying one or more topics that potentially relate to the plurality of text responses. In some embodiments, a user provides the one or more topics, as described above. Alternatively, identifying one or more topics that potentially relate to the plurality of content items includes accessing one or more topics stored in a database.

In addition, the method 700 includes an act 730 of assigning a text response to a topic. In particular, the act 730 can involve assigning one or more text responses within the plurality of the text responses to the one or more topics. For example, the act 730 can include analyzing the plurality of text responses to determine which text responses of the plurality of text responses correlate to the one or more topics. In some embodiments, the act 730 can also include using a topic probability model to determine which text responses of the plurality of text responses correlate to the one or more topics.

Further, the method 700 includes an act 740 of identifying an unknown topic text response. In particular, the act 740 can involve identifying an unknown topic text response from the plurality of text responses that is assigned as an unknown topic. In one or more embodiments, the method 700 can also include providing, to the client device, an indication of one or more unknown text responses.

The method 700 also includes an act 750 of identifying a suggested topic that relates to the unknown topic text response. In particular, the act 750 can involve identifying, based on identifying the unknown topic text response, a suggested topic that potentially relates to the unknown topic text response. For example, in some embodiments, the act 750 can involve providing, to the client device, an option to select the suggested topic, and receiving, from the client device, a selection of the suggested topics. Further, the act 750 can include adding the suggested topic to the stored list of topics.

Additionally, the method 700 includes an act 760 of determining that the unknown topic text response relates to the suggested topic. In some embodiments, the act 760 can include using a probabilistic language model to determine that the unknown topic text response relates to the suggested topic. Further, the method 700 includes an act 770 of assigning the unknown topic text response to the suggested topic. The act 770 may assign the unassigned content item to the additional topic, as described above in connection with the act 630.

Further, the method 700 also includes an act 780 of providing topic assignment results to a client device. In particular, the act 780 can involve providing topic assignment results organized by the one or more topics and the additional topic. For example, the act 780 can involve providing, to a client device associated with a survey reviewer, topic assignment results for the text responses organized by the one or more topics and the suggested topic.

In some embodiments, the method 700 can also include an act of determining one or more communities of words from the plurality of content items, determining a representative word from each of the communities of words, and based on the unassigned content item, providing one or more of the representative words from the communities of words to the client device as a suggested topic.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
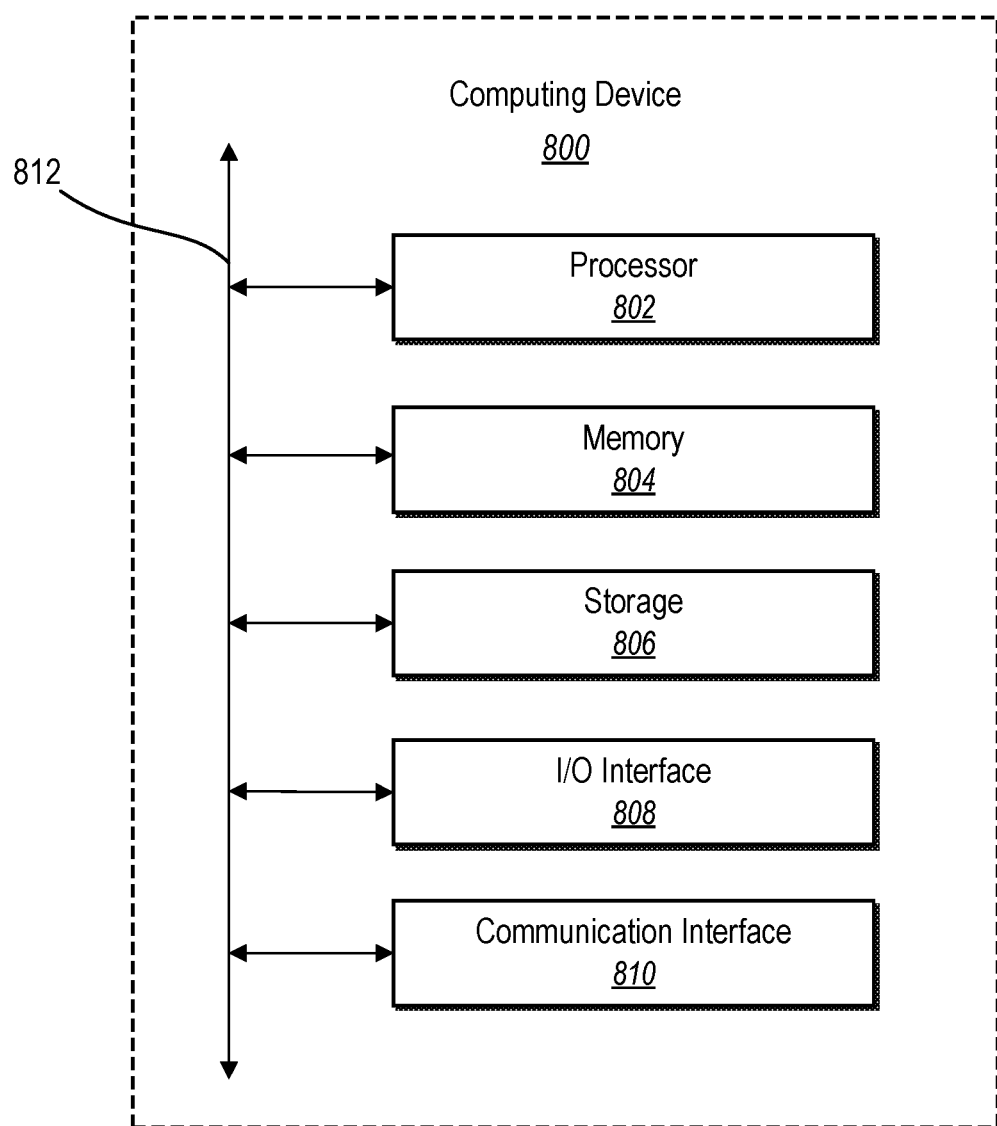
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement administrator device 104, content management system 106, and/or respondent devices 110a-110c. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 606 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
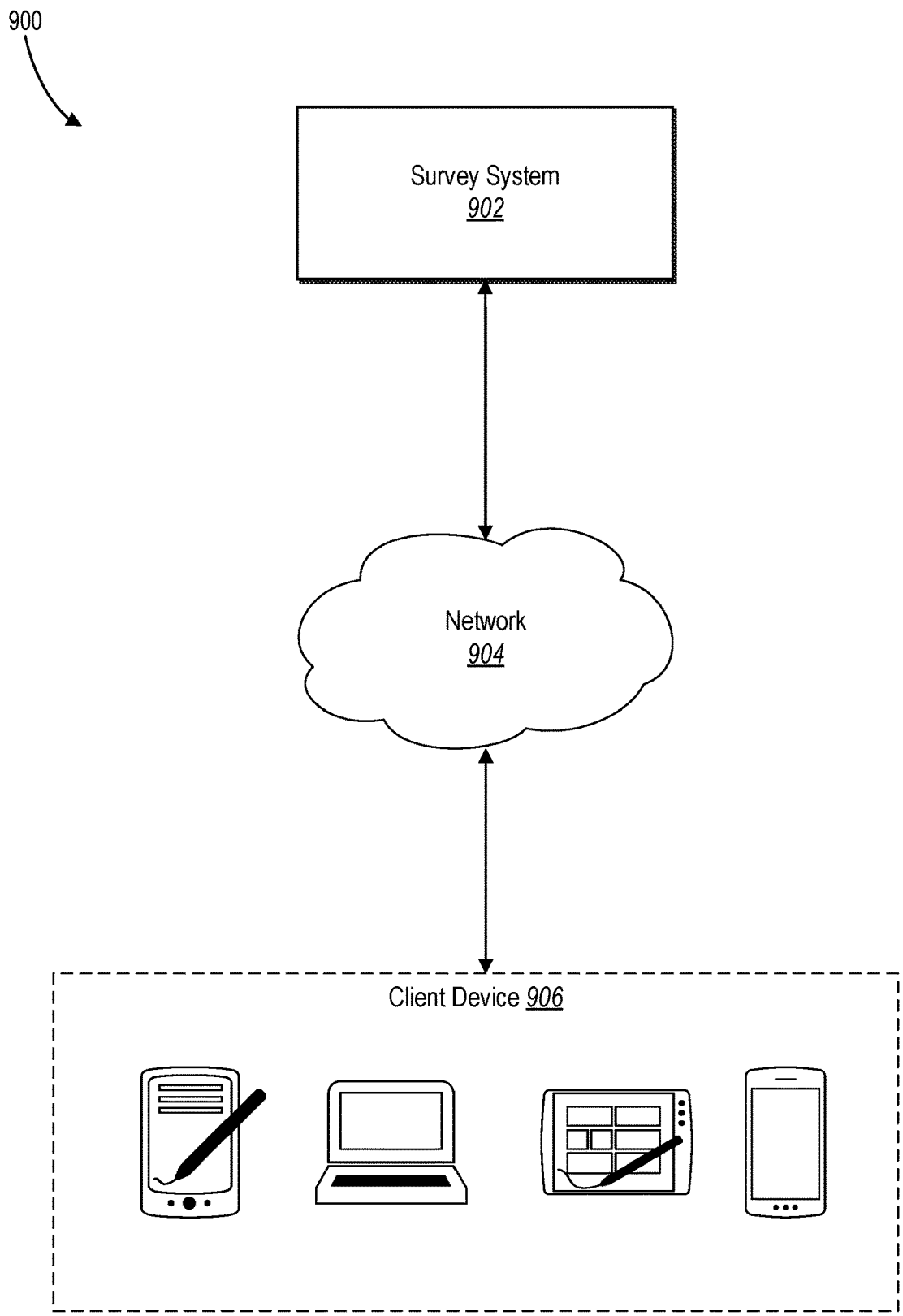
FIG. 9 illustrates an example network environment of a survey management system in accordance with one or more embodiments.

FIG. 9 illustrates an example network environment 900 of a survey management system, such as content management system 106. Network environment 900 includes a client system 906, and a survey management system 902 connected to each other by a network 904. Although FIG. 9 illustrates a particular arrangement of client system 906, survey management system 902, and network 904, this disclosure contemplates any suitable arrangement of client system 906, survey management system 902, and network 904. As an example and not by way of limitation, two or more of client system 906, and survey management system 902 may be connected to each other directly, bypassing network 904.

As another example, two or more of client system 906 and survey management system 902 may be physically or logically co-located with each other in whole, or in part. Moreover, although FIG. 9 illustrates a particular number of client systems 906, survey management systems 902, and networks 904, this disclosure contemplates any suitable number of client systems 906, survey management systems 902, and networks 904. As an example and not by way of limitation, network environment 900 may include multiple client systems 906, survey management systems 902, and networks 904.

This disclosure contemplates any suitable network 904. As an example and not by way of limitation, one or more portions of network 904 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, or a combination of two or more of these. Network 904 may include one or more networks.

Links may connect client system 906, and survey management system 902 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include any of the computing devices discussed above in relation to FIG. 8. A client system 906 may enable a network user at client system 906 to access network 904. A client system 906 may enable its user to communicate with other users at other client systems 906.

In particular embodiments, client system 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, survey management system 902 may include a variety of servers, sub-systems, programs, modules, logs, and data stores. In particular embodiments, survey management system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey management system 902 may also include suitable components such as network interfaces, security mechanisms, load balancers, failover servers, management-and-network-operations consoles, other suitable components, or any suitable combination thereof.

In particular embodiments, survey management system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories and categories may be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
  assigning, by at least one processor, a plurality of content items to one or more predetermined topics;

identifying a group of unassigned content items that are not assigned to the one or more predetermined topics;
providing, to a client device associated with a user, a first unassigned content item from the group of unassigned content items;
receiving, from the client device associated with the user, a user-generated topic corresponding to the first unassigned content item from the group of unassigned content items, wherein the user-generated topic is a different topic from the one or more predetermined topics;
assigning, by the at least one processor and without user input, a second content item from the plurality of content items to the user-generated topic by analyzing the plurality of content items to determine that the second content item correlates to the user-generated topic; and
providing, the client device associated with the user, topic assignment results organized by the one or more predetermined topics and the user-generated topic.

2. The method of claim 1, further comprising assigning a third content item from the group of unassigned content items to the user-generated topic.

3. The method of claim 1, further comprising providing, to the client device associated with the user, a suggested topic.

4. The method of claim 3, wherein the suggested topic is based on at least one of:
an analysis of the group of unassigned content items that are not assigned to the one or more predetermined topics; or
an analysis of the plurality of content items assigned to the one or more predetermined topics.

5. The method of claim 3, further comprising:
receiving, from the client device associated with the user, a selection of the suggested topic; and
assigning a third content item to the suggested topic, wherein the third content item is from either the group of unassigned content items or the plurality of content items assigned to the one or more predetermined topics.

6. The method of claim 5, further comprising providing, to the client device associated with the user, updated topic assignment results organized by the one or more predetermined topics, the user-generated topic, and the suggested topic.

7. The method of claim 1, wherein each content item of the plurality of content items comprises text corresponding to a survey response to an electronic survey question.

8. A system comprising:
at least one processor; and
at least one non-transitory computer readable storage medium storing instructions that, when executed by the at least one processor, cause the system to:
assign a plurality of content items to one or more predetermined topics;
identify a group of unassigned content items that are not assigned to the one or more predetermined topics;
provide, to a client device associated with a user, a first unassigned content item from the group of unassigned content items;
receive, from the client device associated with the user, a user-generated topic corresponding to the first unassigned content item from the group of unassigned content items, wherein the user-generated topic is a different topic from the one or more predetermined topics;
assign, without user input, a second content item from the plurality of content items to the user-generated topic by analyzing the plurality of content items to determine that the second content item correlates to the user-generated topic; and
provide, the client device associated with the user, topic assignment results organized by the one or more predetermined topics and the user-generated topic.

9. The system of claim 8, further comprising instructions that, when executed by the at least one processor, cause the system to assign a third content item from the group of unassigned content items to the user-generated topic.

10. The system of claim 8, further comprising instructions that, when executed by the at least one processor, cause the system to provide, to the client device associated with the user, a suggested topic.

11. The system of claim 10, wherein the suggested topic is based on at least one of:
an analysis of the group of unassigned content items that are not assigned to the one or more predetermined topics; or
an analysis of the plurality of content items assigned to the one or more predetermined topics.

12. The system of claim 10, further comprising instructions that, when executed by the at least one processor, cause the system to:
receive, from the client device associated with the user, a selection of the suggested topic; and
assign a third content item to the suggested topic, wherein the third content item is from either the group of unassigned content items or the plurality of content items assigned to the one or more predetermined topics.

13. The system of claim 12, further comprising instructions that, when executed by the at least one processor, cause the system to provide, to the client device associated with the user, updated topic assignment results organized by the one or more predetermined topics, the user-generated topic, and the suggested topic.

14. The system of claim 8, wherein each content item of the plurality of content items comprises text corresponding to a survey response to an electronic survey question.

15. A non-transitory computer readable storage medium storing instructions that, when executed by at least one processor, cause a computer device to:
assign a plurality of content items to one or more predetermined topics;
identify a group of unassigned content items that are not assigned to the one or more predetermined topics;
provide, to a client device associated with a user, a first unassigned content item from the group of unassigned content items;
receive, from the client device associated with the user, a user-generated topic corresponding to the first unassigned content item from the group of unassigned content items, wherein the user-generated topic is a different topic from the one or more predetermined topics;
assign, without user input, a second content item from the plurality of content items to the user-generated topic by analyzing the plurality of content items to determine that the second content item correlates to the user-generated topic; and
provide, the client device associated with the user, topic assignment results organized by the one or more predetermined topics and the user-generated topic.

16. The non-transitory computer readable storage medium of claim 15, further comprising instructions that, when executed by the at least one processor, cause the computer device to assign a third content item from the group of unassigned content items to the user-generated topic.

17. The non-transitory computer readable storage medium of claim 15, further comprising instructions that, when executed by the at least one processor, cause the computer device to provide, to the client device associated with the user, a suggested topic.

18. The non-transitory computer readable storage medium of claim 17, wherein the suggested topic is based on at least one of:
- an analysis of the group of unassigned content items that are not assigned to the one or more predetermined topics; or
- an analysis of the plurality of content items assigned to the one or more predetermined topics.

19. The non-transitory computer readable storage medium of claim 18, further comprising instructions that, when executed by the at least one processor, cause the computer device to:
- receive, from the client device associated with the user, a selection of the suggested topic; and
- assign a third content item to the suggested topic, wherein the third content item is from either the group of unassigned content items or the plurality of content items assigned to the one or more predetermined topics.

20. The non-transitory computer readable storage medium of claim 19, further comprising instructions that, when executed by the at least one processor, cause the computer device to provide, to the client device associated with the user, updated topic assignment results organized by the one or more predetermined topics, the user-generated topic, and the suggested topic.

* * * * *